United States Patent [19]

Scheuneman

[11] Patent Number: 4,757,440
[45] Date of Patent: Jul. 12, 1988

[54] PIPELINED DATA STACK WITH ACCESS THROUGH-CHECKING

[75] Inventor: James H. Scheuneman, St. Paul, Minn.

[73] Assignee: Unisys Corporation, Blue Bell, Pa.

[21] Appl. No.: 596,131

[22] Filed: Apr. 2, 1984

[51] Int. Cl.[4] ............................................. G06F 13/00
[52] U.S. Cl. ........................................ 364/200; 371/51
[58] Field of Search ................. 371/51, 53, 38, 52;
364/200 MS File, 900 MS File; 365/200, 201, 219

[56] References Cited

U.S. PATENT DOCUMENTS

| | | | |
|---|---|---|---|
| 3,963,908 | 6/1976 | Das | 371/51 |
| 4,108,359 | 8/1978 | Proto | 371/53 |
| 4,138,720 | 2/1979 | Chu et al. | 364/200 |
| 4,151,598 | 4/1979 | Webster | 364/900 |
| 4,197,580 | 4/1980 | Chang et al. | 364/200 |
| 4,220,990 | 9/1980 | Alles | 364/200 |
| 4,228,500 | 10/1980 | Webster | 364/200 |
| 4,241,396 | 12/1980 | Mitchell et al. | 364/200 |
| 4,288,860 | 9/1981 | Trost | 364/900 |
| 4,319,356 | 3/1982 | Kocol et al. | 371/38 |
| 4,386,402 | 5/1983 | Toy | 364/200 |
| 4,453,216 | 6/1984 | Chiba et al. | 364/200 |

Primary Examiner—Gareth D. Shaw
Assistant Examiner—Jonathan C. Fairbanks
Attorney, Agent, or Firm—Charles A. Johnson; Lawrence J. Marhoefer

[57] ABSTRACT

A virtual stack structure utilizing Write Pointers and Read Pointers for providing pipelined data words on a first-in first-out basis to a memory structure is described. The virtual stack structure incorporates a plurality of Stack Registers each having an unique Write Tag and Read Tag associated therewith. The Write Tags are utilized to through-check the decoding of the Write Pointer and to issue Write Tag Error signals when it is determined that the Write Pointer has been improperly decoded. Circuitry is provided for checking the appropriate loading of the Write Pointer in the stack, and issuing an error signal when improper loading is sensed. Each of the Stack Registers has an unique Read Tag associated therewith that is utilized to through-check the decoding of the Read Pointer and to issue Read Tag Error signals when improper decoding is detected. Comparison circuitry is utilized to determine that the Read Pointer has been properly loaded in the stack structure, and to issue an error signal when improper loading is sensed.

11 Claims, 15 Drawing Sheets

DATA STACK READ / WRITE POINTER TAG

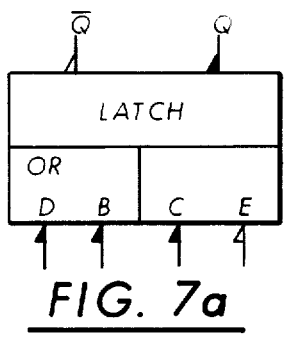
FIG. 7a
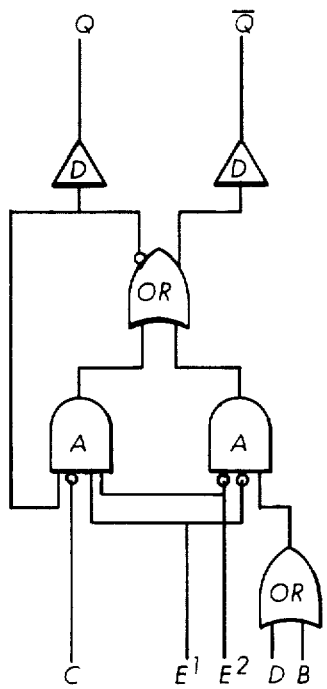
FIG. 7c
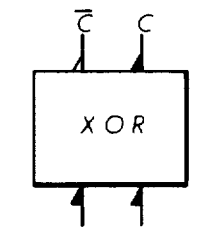
FIG. 8a
| $\bar{C}$ | C | A | B |
|---|---|---|---|
| H | L | L | L |
| L | H | L | H |
| L | H | H | L |
| H | L | H | H |
FIG. 8b
| IN | | | | OUT | |
|---|---|---|---|---|---|
| D | B | C | E | $\bar{Q}$ | Q |
| | | H | H | H | L |
| | | ↓ | ↑ | U | U |
| | | L | H | – | – |
| L | L | | | L | H |
| H | H | | | L | L |
| | H | | | L | H |
| H | | | | L | H |
FIG. 7b
| ADVANCE | COUNT | | |
|---|---|---|---|
| 0 | L | L | L |
| 1 | L | L | H |
| 2 | L | H | L |
| 3 | L | H | H |
| 4 | H | L | L |
| 5 | H | L | H |
| 6 | H | H | L |
| 7 | H | H | H |
FIG. 11b
DECODER TRUTH TABLE
| INPUT | | | | | OUTPUT | | | | | | | |
|---|---|---|---|---|---|---|---|---|---|---|---|---|
| H | EN | $2^2$ | $2^1$ | $2^0$ | 0 | 1 | 2 | 3 | 4 | 5 | 6 | 7 |
| H | L | L | L | L | L | H | H | H | H | H | H | H |
| H | L | L | L | H | H | L | H | H | H | H | H | H |
| H | L | L | H | L | H | H | L | H | H | H | H | H |
| H | L | L | H | H | H | H | H | L | H | H | H | H |
| H | L | H | L | L | H | H | H | H | L | H | H | H |
| H | L | H | L | H | H | H | H | H | H | L | H | H |
| H | L | H | H | L | H | H | H | H | H | H | L | H |
| H | L | H | H | H | H | H | H | H | H | H | H | L |
FIG. 10c
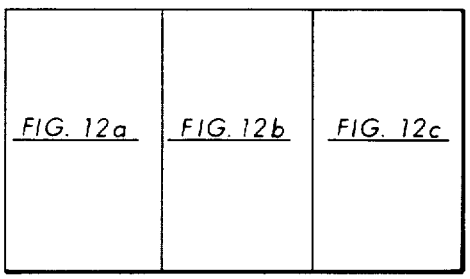
FIG. 12

PIPELINED DATA STACK WITH ACCESS THROUGH-CHECKING

CONTENTS

Related Patent Applications
Contents
Background of the Invention
   A. Field of the Invention
   B. State of the Prior Art
Objects
Summary of the Invention
Brief Description of the Drawings
Description of the Preferred Embodiment
   A. Conventions
   B. The System
   C. High Performance Storage Unit
   D. Multiple Unit Adapter
   E. Scientific Processor
   F. Stack Access Through-Check System
   G. Timing Sequence
   H. Building Blocks
   I. Detailed Logic

RELATED PATENT APPLICATIONS

The following co-pending patent applications are assigned to the assignee of this invention, and their teachings are incorporated herein by reference:
Title: HIGH PERFORMANCE STORAGE UNIT
   Inventor: James H. Scheuneman
   Serial No.: 596,130
   Filed: Apr. 2, 1984, now U.S. Pat. No. 4,633,434.
Title: MULTIPLE UNIT ADAPTER
   Inventor: James H. Scheuneman
   Serial No.: 596,205
   Filed: Apr. 2, 1984, Abandon, now continuation No. 07/047,579.

BACKGROUND OF THE INVENTION

A. Field of the Invention

This invention relates to the field of digital data processing systems wherein one or more host data processors utilize one or more supporting scientific processors in conjunction with storage systems that are commonly accessible. More particularly it relates to an improved high performance storage unit for use in such a digital data processing system. Still more particularly it relates to an improvement of an improved pipelined stack that utilized stack register tag identifiers to provide through-checking of stack register decoding for enhanced data integrity through a high performance storage unit.

B. State of the Prior Art

Digital data processing systems are known wherein one or more independently operable data processors function with one or more commonly accessible main storage systems. Systems are also known that utilize a support processor with its associated dedicated supporting, or secondary storage system. Such support processors are often configured to perform specialized scientific computations and are commonly under task assignment control of one of the independently operable data processors. The controlling data processor is commonly referred to as a "hot processor". The host processor characteristically functions to cause a task to be assigned to the support processor; to cause required instructions and data to be transferred to the secondary storage system; to cause the task execution to be initiated; and to respond to signals indicating the task has been completed, so that results can be transferred to the selected main storage systems. It is also the duty of the host processor to recognize and accommodate conflicts in usage and timing that might be detected to exist. Commonly, the host processor is free to perform other data processing matters while the support processor is performing its assigned tasks. It is also common for the host processor to respond to intermediate needs of the support processor, such as providing additional data if required, responding to detected fault conditions and the like.

In the past, support scientific data processors have been associated with host data processing systems. One such prior art scientific processor is disclosed in U.S. Pat. No. 4,101,960, entitled "Scientific Processor" and assigned to Burroughs Corporation, of Detroit, Mich. In that system, a single instruction multiple data processor, which is particularly suited for scientific applications, includes a high level language programmable front-end processor; a parallel task processor with an array memory; a large high speed secondary storage system having a multiplicity of high speed input/output channels commonly coupled to the front-end processor and to the array memory; and an over-all control unit. In operation of that system, an entire task is transferred from the front-end processor to the secondary storage system whereupon the task is thereafter executed on the parallel task processor under the supervision of the control unit, thereby freeing the front-end processor to perform general purpose input/output operations and other tasks. Upon parallel task completion, the complete results are transferred back to the front-end processor from the secondary storage system.

It is believed readily seen that the front-end processor used in this earlier system is a large general purpose data processing system which has its own primary storage system. It is from this primary storage system that the entire task is transferred to the secondary storage system. Further, it is believed to be apparent that an input/output path exists to and from the secondary storage system from this front-end processor. Since task transfer involve the use of the input/output path of the front-end processor, it is this input/output path and the transfer of data thereon between the primary and secondary storage systems which becomes the limiting link between the systems. Such a limitation is not unique to the Scientific Processor as disclosed in U.S. Pat. No. 4,101,960. Rather, this input/output path and the transfers of data are generally considered to be the bottleneck in many such earlier known systems.

The present scientific data processing system is considered to overcome the data transfer bottleneck by providing an unique system architecture using a high speed memory unit which is commonly accessible by the host processor and the scientific processor. Further, when multiple high speed storage units are required, a multiple unit adapter is coupled between a plurality of high speed memory units and the scientific processor.

Data processing systems are becoming more and more complex. With the advent of integrated circuit fabrication technology, the cost per gate of logic elements is greatly reduced and the number of gates utilized is ever-increasing. A primary goal in architectural design is to improve the through-put of problem solutions. Such architectures often utilize a plurality of processing units in cooperation with one or more multiple port memory systems, whereby portions of the same problem solution may be parcelled out to different processors or different problems may be in the process of solution simultaneously.

When a SP is utilized in a data processing system to perform supporting scientific calculations in support of a host processor or processors, and is utilized in conjunction with two or more HPSU's, the problem of timing of access of the SP to any selected HPSU for either reading or writing causes problems of access coordination. In order to coordinate and provide the required control, the over-all system is arbitrarily bounded to require that the SP issue no more than a predetermined number of Requests for access without the receipt back of an Acknowledge. In one configuration, the system is bounded by requiring that no more than eight such Requests be issued by the SP without receipt of an Acknowledge. The details of the interface and control of a Multiple Unit Adapter for transmitting data to and from a designated HPSU by the SP is described in detail in the co-pending application entitled "Multiple Unit Adapter". There it is pointed out that the interface to the HPSU's must also provide for and accommodate different requesters that may be associated therewith. While the data processing system is essentially synchronous, that is operations are under clock control in their execution, the occurrence of Requests, the availability of responding units, and the occurrence of Acknowledge signals are asynchronous with respect to each other. The details of operation of the HPSU's are set forth in detail in the co-pending application entitled "High Performance Storage Unit".

The prior art has recognized the advantageous operation of utilizing buffers to match transmissions between two operating systems that have different operational rates. As so-called pipelined architectures were developed to improve the rates of through put, the concept of buffering was extended to the development of intermediate stack structures for temporarily storing or holding data items pending availability of the destination unit. Early versions of stacks of this type involved a first-in, first-out (FIFO) structural arrangement with control that would cause Requests and data to be shifted through the stack shift registers such that the first Request and its associated data would be processed first and then on in order as they occurred. This type of shift requester stack requires the control to cause shifting through the registers as Acknowledges are received, together with control to determine when the stack is full and no more Requests can be received. Shifting stacks are relatively slow, consume unnecessary power, and require an undue amount of circuitry to implement.

The problems with shift register stacks have been addressed and various configurations of virtual FIFO stacks have been developed. In virtual FIFO stacks data words are stored in registers controlled by loading identifiers. The data words once stored remain in the associated stack register until accessed for readout, and do not shift from register to register. Instead, the shifting of readout is directed and controlled by readout control signals. In operation, then, when data is to be loaded or written in the stack, the Load Pointer (Load PTR) or Write Pointer (Write PTR) is advanced for each write operation. Similarly, for each read operation the Read Pointer (Read PTR) is advanced. When appropriately controlled, the Pointers sequence circularly through the stack registers at all times providing a FIFO function. By thus controlling the Pointers, it is unnecessary to shift the data from stack register to stack register. When no data is stored in the stack, the two pointers would reference the same stack register address. The difference between the Load PTR and Read PTR indicates the number of words in the buffer stack. When the Pointers are binary numbers the difference is a numerical count.

It is of course apparent that since the virtual FIFO stack is functionally circular, external control must be exercised in applying Requests to read and write to avoid over-writing. Accordingly, such virtual stacks are also normally bounded to accommodate a predetermined number of load Requests that can occur without having received an Acknowledge that results from reading out a register from the stack.

Virtual FIFO stacks are described in the identified co-pending applications, and have been described in technical literature.

Various other types of virtual stack structures have been described, for example where a virtual FIFO buffer can accommodate variable numbers of data words, and where synchronization is dynamically adjusted depending upon the rate of transfer through the FIFO buffer. An example of the latter type of FIFO buffer is described in U.S. Pat. No. 4,288,860, entitled "Dynamic Storage Synchronizer Using Variable Oscillator" issued to John R. Trost and assigned to the assignee of the subject invention.

In fabrication it is common for the stack registers to be fabricated in segments such that the conceptual single stack of registers is in reality a plurality of parallel stacks where each stack stores a predetermined segment of the data word. Characteristically, it is common to provide multiple parallel stacks segmented on the basis of bytes of data, where a byte is normally defined to include a divisible subset of an entire data word. When thus configured, and however accessible, it is required that the loading or reading be decoded for each of the parallel stacks such that all segments of a word to be accessed are uniformly identified. It has become clear that decoding of the access control signals can be the subject of error conditions. Such errors can occur when specific segments of a particular word in the parallel stacks are incorrectly decoded such that access in one or more of the stacks is incorrectly accessed to reform a total data word. Normally each segment of the data word will have a parity bit associated therewith, but when one or more segments are incorrectly accessed due to decoding errors, the parity check for each segment will presumably check correctly and will not indicate that the resultant word is in fact made up of a combination of segments that is incorrect. In this context "data word" means actual data signals together with appropriate associated signals such as required to provide address and function control. It is of course apparent that the segments may be equal in the number of bits utilized, but also may differ in the number of bits.

OBJECTS OF THE INVENTION

It is a primary of object of this invention to provide an improved digital data processing system wherein one or more host data processors utilize one or more supporting scientific processors in conjunction with storage systems that are commonly accessible.

Another primary object of the invention is to provide an improved High Performance Storage Unit for use in a data processing system.

It is a further primary object of the invention to provide an improved stack structure.

It is another object of the invention to provide an improved stack structure having stack register decoding through-checking to provide enhanced data integrity.

Yet another object of the invention is to provide an improved stack structure that utilizes stack register tag identifiers for through-checking of stack register decoding.

Another object of the invention is to provide an improved stack structure utilizing a plurality of stack registers, each for storing predetermined data signals, together with associated stack register tag identifiers commonly accessed during loading and reading and available for comparison at readout for use in checking accuracy of decoding of access to the stack register structure.

Still another object of the invention is to provide a partially duplexed stack structure that is economical to construct and operate.

Still another object of the invention is to provide an improved stack structure for providing through-checking of accuracy of stack register access decoding that imposes minimal time overhead in passing data through the stack structure.

Still another object of the invention is to provide an improved stack structure having a plurality of stack registers for storing bit groupings in addressable locations and stack register tag identifiers associated therewith in like-addressable locations and having comparison circuitry for comparing stack register access signals to like-situated tag identifiers and having comparison error signal circuitry for providing error signals when comparison between associated stack register access signals and tag identifying is not found to exist.

It is a further primary object of the invention to provide an improved first-in-first-out (FIFO) stack structure.

It is another object of the invention to provide an improved FIFO stack structure having stack register decoding through-checking to provide enhanced data integrity.

Yet another object of the invention is to provide an improved Virtual FIFO stack structure that utilizes stack register tag identifiers for through-checking of stack register decoding.

Another object of the invention is to provide an improved virtual FIFO stack structure utilizing a plurality of stack registers each for storing predetermined data signals, together with associated stack register tag identifiers commonly accessed during loading and reading and available for comparison at readout for use in checking accuracy of decoding of access to the stack register structure.

Still another object of the invention is to provide an improved virtual FIFO stack structure having a plurality of stack registers for storing bit groupings in addressable locations and stack register tag identifiers associated therewith in like-addressable locations and having comparison circuitry for comparing stack register access signals to like-situated tag identifiers and having comparison error signal circuitry for providing error signals when comparison between associated stack register access signals and tag identifiers is not found to exist.

The foregoing objectives and other more detailed and specific objects will become apparent and be understood from the drawings and the description of the invention.

SUMMARY OF THE INVENTION

The digital data processing system includes one or more host processors each coupled to one or more high performance storage units. Host processors can be selected from units available commercially, where the 1100/90 System available from Sperry Corporation is found to be particularly advantageous.

The High Performance Storage Unit (HPSU) is unique, and is basically a memory unit capable of coupling to various pluralities of instruction processors, and input/output units as well as to a pair of Scientific Processor (SP). Since each HPSU is directly connected to the input/output units and the instruction processors of the host system, it is an inherent part of the host data processing system. On the other hand, since it is also directly connected to the Scientific Processor, it is also its main storage system. Because of its novel properties, it is able to interface both with the host system and the Scientific Processor without the resulting "bottleneck" of past scientific data processing systems.

When more than one HPSU is desired to provide additional storage capacity, a Multiple Unit Adapter (MUA) is utilized between each Scientific Processor and multiple High Performance Storage Units. Generally, the MUA is an interface unit which couples a single Scientific Processor through the use of a single Scientific Processor port to a plurality of up to four HPSU's via four HPSU ports. In this manner a Scientific Processors may address, read and write any location in any of the HPSU's.

The MUA is used in a scientific data processing system to interface at least one Scientific Processor to a plurality of High Performance Storage Units. The use of a separate MUA in such a data processing system enables the Scientific Processor of such a system to have a single HPSU port to thereby reduce the cost of the Scientific Processor when a single HPSU is desired to be used in the system. This MUA is required only when more than one HPSU is used in the scientific data processing system, thereby providing the additional memory interfaces needed for the Scientific Processor.

The Scientific Processor (SP) used herein is a special purpose processor attached to the host system via the HPSU's. It is optimized for high speed execution of floating-point vector arithmetic operations. The SP provides increased performance for both integer and floating-point scalar operations that are embedded in the vectorized code to thereby provide overall increased performance for scientific vector FORTRAN programs.

The invention includes a first-in first-out stack structure for providing a pipelined temporary storage of words to be stored in the High Performance Storage Unit pending availability of access of the stack to the memory system. The stack structure includes a plurality of registers for storing data words to be recorded or written, with each stack register being accessed for writing into the register by a Write Pointer (Write PTR). The data words are pipelined in sequence, and the Write PTR is advanced for each requested loading function into the stack structure. By thus advancing the Write PTR, requests can be loaded up to the capacity of the stack structure without having to read out any of the stack registers. In the preferred embodiment, the number of requests that can be processed without any read out is predetermined. The Write PTR is decoded for enabling one and only one of the stack registers. In order to assure the proper functioning of the decoding, a Write Tag (WTAG) is associated with each stack register and is selected by the same decoding function. Each WTAG provides a unique set of signals indicative of the addressed stack register and is compared to the applied Write PTR for checking the proper functioning of the Write PTR decoder. If the comparison fails, a Write Tag Error signal is issued.

In order that it be determined that the Write PTR is properly loaded, the Write PTR is loaded into a pair of parallel registers and compared for equality. A failure of comparison results in the issuance of the Write PTR Load Error Signal.

In the virtual pipelined stack configuration, reading from the stack is under control of a Read Pointer (Read PTR). The Read PTR is decoded and provides an unique identification of the stack register selected to be read out. In order to maintain the integrity of the data being stored in the HPSU, it is imperative that the stack registers be read out sequentially. Any error occurring in the decoding of the Read PTR will cause corrupted data to pass through the system in sequence even though the data passed is accurate. In order to forestall the passing through of corrupted data, each stack register has associated with it a Read Tag (RTAG) that comprises a source of unique signals representative of the associated stack register. The particular RTAG is selected by the same decoder that decodes the selection of the stack register. The selected RTAG is compared to the applied Read PTR, and if comparison fails, a Read Tag Error signal is issued.

In order to assure that the Read PTR is properly loaded, it is loaded into two parallel registers and the output of the Read PTR registers are compared. If inequality is detected, a Read PTR Load Error signal is issued.

If the Write PTR is improperly loaded, it will cause data to be written in an erroneous register and may write over properly stored data. Similarly, if a proper Write PTR is improperly decoded, it will also cause a write-over at an erroneous location. In essence, then, either type of error condition will cause at least one error in the stack and may result in two errors in the stack depending upon the sequence of write and read functions. In a similar manner, if a Read PTR is improperly loaded, it will cause a read out of an improperly identified stack register, and will result in a corrupted data word stream. In the event a proper Read PTR is improperly decoded, there will again be reference to an improper stack register, and the data word stream will be corrupted.

The invention recognizes these problems, and by appropriately through-checking the stack accessing functions, verifies the integrity of the pipelined stream of data words and signals when error conditions are detected.

BRIEF DESCRIPTION OF THE DRAWINGS

FIGS. 6, 6a and 6b are timing sequences of diagrams illustrating the sequences of the through-checking of stack access signals;

FIG. 7a is a logic block diagram for a Latch, that will provide true output Q and complement output $\overline{Q}$;

FIG. 7b is a Truth Table for the functioning of the Latch illustrated in FIG. 7a;

FIG. 7c is a logic element drawing of the Latch illustrated in FIG. 7a, and illustrates the logical elements and interconnections to accomplish the Latch functions;

FIG. 8a is the logic block diagram symbol for the two-input Exclusive-OR (XOR);

FIG. 8b is the Truth Table for the Exclusive-OR illustrated in FIG. 8a;

FIG. 10b is a table illustrating the selected stack register in response to Pointer input signals for the three-to-eight decoder illustrated in FIG. 10a;

FIG. 10c is a decoder truth table for the decoder illustrated in FIG. 10a;

FIG. 11a is a logic block diagram of a three-stage binary counter;

FIG. 11b is a table illustrates count output signals for the counter illustrated in FIG. 11a;

DETAILED DESCRIPTION OF THE PREFERRED EMBODIMENT

A. Conventions

Figure 1:
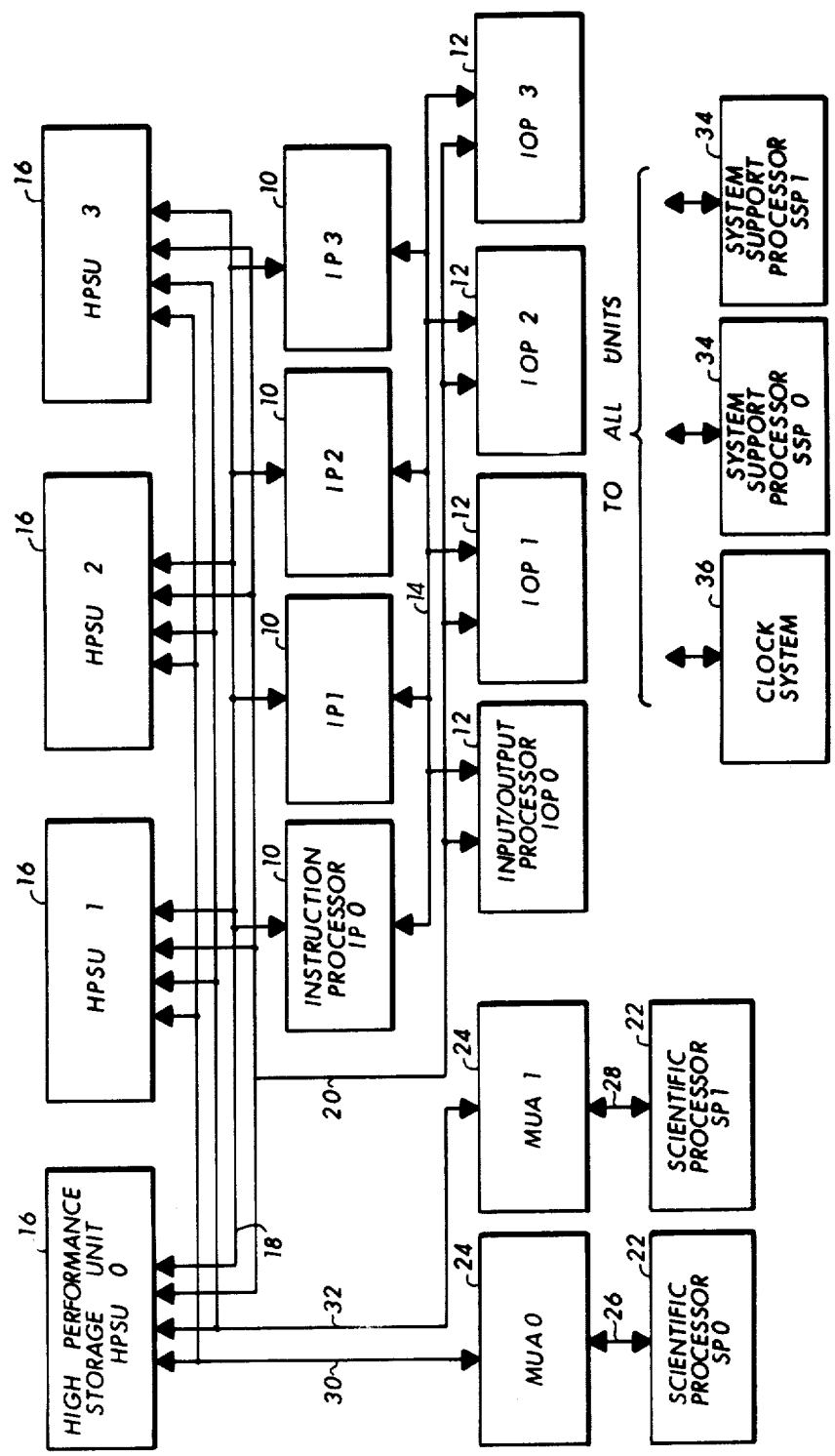
FIG. 1 is a system block diagram of the over-all digital data processing system in which the invention can be utilized.

Throughout the following description and in the accompanying drawings there are certain conventions employed which are familiar to those that are skilled in the art to which this invention pertains. Within the application, reference numerals will be affixed to elements and items discussed. To the extent possible, elements that are referenced in different figures within the application will bear the same reference numeral. It will be understood that elements may be described or mentioned in others of the identified co-pending applications, but will not necessarily bear the same numeral reference between applications.

The signal lines, control lines, and cables are accorded unique descriptive names which will remain invariant to the extent possible at all points of usage and reference within the application. Signal lines generally enter at the bottom of a Figure and exit at the top, resulting in a general flow from bottom to top. Signals and signal lines which enter or exit the logic circuit of a Figure all together from outside the circuit are accorded descriptive symbolism in order that they may be clearly recognized.

Block diagrams will be utilized to describe the interrelationship of identified functional units. Interconnecting lines between functional units can represent a single wire conductor, a group of parallel conductors, or a general path of data for control flow. In block diagrams the arrowhead will indicate the direction of signal flow for the particular data or control signals identified. Where appropriate, emphasis for particular lines may be added to indicate specific paths, for example through the use of heavy lines; through addition of numerals indicative of the number of conductors or parallel signal paths involved, or by indication of unique function. Within block diagrams specific logical symbols for well known components such as adders, selecters, registers, multiplexers, and the like may be utilized without further explanation of the specific elements, since such elements are so well known in the art as they require no additional explanation.

For purposes of discussion of specific logic block diagrams or functional logic circuits, it is convenient to have a reference of signal levels. For many it is desirable to relate logical "1" and logical "0" to signal levels. In general, a logical "1" will be the equivalent of a High signal, and a logical "0" will be the equivalent of a Low signal, but it should be clearly understood that as given input signals pass through networks of logic circuits that the relationship of logical "1" and logical "0" as they relate to numerical values will not directly relate. Accordingly, the clearest understanding of logic block diagrams and functional logic circuits will be most clearly understood from a consideration of the High and Low signal interrelationships. It is of course understood that these representations of signal levels are illustrative and relate to a rendition of the preferred embodiment, but that alternative signal level representations can be used without departing from the scope of the invention.

In more detailed logic block diagrams, block symbols will be utilized to represent various functions. For the lower order logical functions such as AND, designated A; OR; Inversion designated I, and the like, the designations within the block symbols of the respective functions is readily understandable to those skilled in the art. More complex macro logical functions, for example multiple input Exclusive-OR, designated XOR, may not be readily apparent from the block symbol, and in such cases the macro function will be further defined through functional logic diagrams or truth tables or a combination thereof.

As a further aid in understanding the logic block diagram representations, a system of arrowhead representation at the input and output of the block symbols will assist in defining the function of the associated logic element. In this regard, the combination of signals represented at the input of a logic element in combination with the designation of the logical function will define the signal level or levels at the output of the logic element. At the input, a closed half-arrowhead represents a response to a High signal and an open half-arrowhead indicates that the response is to a Low signal. Accordingly, if an AND circuit (A) is represented having two or more closed half-arrowheads at the input, it will indicate that the AND function is on High signals and will be satisfied only when all input lines receive High signals. In a similar manner, if an A symbol is illustrated having two or more open-arrowhead inputs, the function designated is that of Low AND, and will be satisfied only when all inputs are Low. It is apparent that this Low AND function is logically equivalent of a High OR function. In a similar fashion, the half-arrowhead convention is applied to define output relationships.

In physical construction of circuits to implement the designated logic functions, it is not uncommon to provide signal inversion in conjunction with the combinatorial logic function. In such cases, the fact of inversion will be designated by the state of the half-arrowhead on the output line or lines. In this way, it will be understood that a Low AND circuit having two or more open half-arrowhead inputs will provide a Low output signal at the open half-arrowhead output terminal only when all input signals are Low. If the Low AND circuit has a closed half-arrowhead at its output, it is understood that inversion takes place within the logic block element, and the High output signal will be derived only when all input signals are low. It is also common for circuits implemented through integration techniques to provide an output signal and the complement of the output signal on separate lines. This representation in the logic block diagram symbol will result in an open half-arrowhead and a closed half-arrowhead at the output of the block. Generally speaking the right-most half-arrowhead in the symbolic representation will be considered as the true output and will define the function of the element, and the left-most half-arrowhead will be considered as the complement thereof. For example, an A symbol having two or more closed half-arrowhead inputs and a right-most closed half-arrowhead would normally indicate an AND function of High signals resulting in a High output signal at the closed half-arrowhead only when all input signals are High. If this same symbol utilizes an open half-arrowhead at the left, a Low output signal will be derived at that point when all input signals are High. It is not deemed necessary to illustrate specific circuits to accomplish the basic logic functions since various types of electronic circuits can be utilized and are well known to those skilled in the art.

In the event detailed logical circuit diagrams of macro symbols are illustrated, the symbol having a straight bottom and rounded top, sometimes referred to as the "bullet" symbol, represents the logical AND function and the symbol having a curve at the input and the curve pointed output, often referred to as the "shield" symbol, represents circuits that perform the logical OR function. For the AND function the straight line input or the dot, represents a High AND, and results in a High output signal when all input signals are High. The open circles adjacent the input terminals indicate that the circuit responds to Low signals. The straight line output is equivalent to the closed half-arrowhead representation described above, and the circle output designation is equivalent to the open half-arrowhead representation. This type of symbol is well known in the art and need not be described further.

B. The System

FIG. 1 is a system block diagram of the over-all digital data processing system in which the invention can be utilized. The over-all system is essentially modular, and provides for parallel processing.

For the configuration illustrated, from one to four Instruction Processors IP0 through IP3, each labelled 10, can be utilized. Each IP can for example be a Type 3054-00 unit available from Sperry Corporation, or such other Instruction Processor available commercially as would be compatible. The IP provides basic mode and extended mode instruction execution, virtual machine capability, and contains two buffer memories (not shown), one an operand buffer, and the other an instruction buffer. Each IP is functional to call instructions from memory, execute the instructions, and in general does data manipulation. The IP also executes instructions to set up input and output data buffers and channel access control.

In conjunction with the IPs, from one to four Input/Output Processors IOP0 through IOP3, labelled 12, can be utilized. The interconnections between the IPs and the IOPs, collectively labelled 14, are in fact direct connecntions between each unit, and the interconnection is not bused. Each IOP can be a Type 3067-00 unit available from Sperry Corporation, or an equivalent type of processor. The IOPs handle all communications between the IPs, and the memory systems, and the peripheral subsystems (not shown). In this type of configuration, the IPs function as the sys-Central Processing Units, and the IOPs act as CPUs to handle all of the communications. The IPs and IOPs are commonly referred to as the 1100/90 system.

From one to four High Performance Storage Units HPSU0 through HPSU3, each labelled 16, can be utilized in the system. Each HPSU is a free-standing unit with eight memory Banks, each Bank containing 524K words. Each HPSU provides four Instruction Processor (IP) ports for providing communication paths to the IPs, both for reading and writing, shown collectively as interconnection paths 18. Again it should be understood that interconnection between each HPSU and each IP is directly cabled, and is not bused. Each HPSU also includes four Input/Output Processor (IOP) ports for interconnection with the IOPs. These interconnections are shown collectively as interconnections 20 and are direct cables between each HPSU and each IOP. The IP and the IOP ports are each two-word read and write interfaces, where each word contains 36 data bits and four parity bits. Each HPSU also includes at least one Scientific Processor (SP) port, and in the embodiment shown has two such SP ports. Each SP port has a four-word data interface. The IOP and the IP interfaces operate on a 60 nanosecond clock cycle and the SP interface operates on a 30 nanosecond clock cycle. The HPSU is a novel memory system and is described in one or more of the above identified copending incorporated patent applications.

Error Correction Code (ECC) is used internal to each HPSU to provide single-bit error correction and double-bit error detection.

In the embodiment illustrated one or two Scientific Processors SP0 and SP1, labelled 22, can be utilized. If a single SP is used with a single HPSU, it may be coupled directly to the SP port of such HPSU. When two or more HPSUs are used with an SP, it is necessary to provide a Multiple Unit Adapter (MUA) for each SP. In this configuration MUA0 and MUA1, each labelled 24, are coupled to SP0 and SP1, respectively, across interface lines 26 and 28. MUA0 is coupled to each HPSU through interconnection paths 30, and MUA1 is coupled to each HPSU through interconnection path 32.

Each SP functions under direction of one or more of the IPs to perform scientific type calculations in a support mode. In this regard, the IPs can be considered to be host processors and the SPs can be considered to be support processors, all operating through common storage.

The over-all system maintenance and supervision is accomplished through one or two System Support Processors SSP0 and SSP1, each labelled 34, which are connected to all units of the system. The SSP is available commercially and is utilized in the Sperry Corporation 1100/90 Systems. In general, it is understood that each SSP performs the function of a hardware maintenance panel for the system. The display and setting of information, the activation of most maintenance facilities, selecting modes of operation and the like, is done at the control section of the SSP.

A Clock System 36 is utilized to maintain synchronous operation of the entire system. Clock and synchronizing signals are sent to each IP as will as each HPSU, each IOP, and each SP. The clock interface includes signals and commands from the IP for controlling clock rates, clock mode, cycle count, and other capabilities of the clock. The clock system is novel, and is described in one of the above identified copending patent applications.

Intercommunication between units is essentially on a Request and Acknowledge basis, and the interfaces will be described in more detail as appropriate.

C. High Performance Storage Unit (HPSU)

Figure 2:
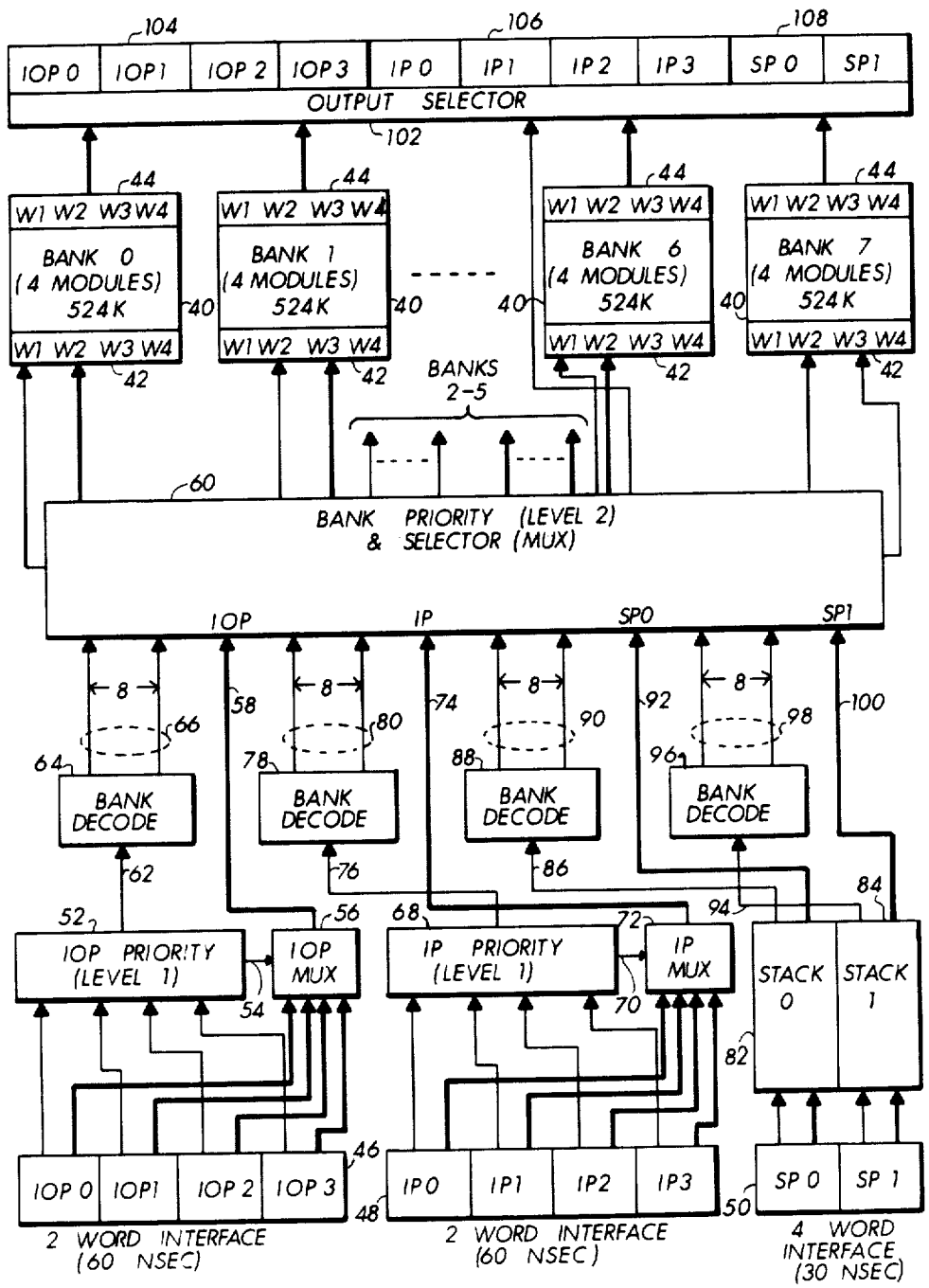
FIG. 2 is a simplified functional block diagram of the High Performance Storage Unit.

FIG. 2 is a simplified functional block diagram of the High Performance Storage Unit.

The HPSU is a storage device that is commonly accessable by the IPs, the IOPs, and the SPs via the MUAs. The various devices that can be coupled to the HPSU can have differing interface systems and operational rates.

In the preferred embodiment, the HPSU utilizes eight Banks of storage devices, generally identified as Bank 0 through Bank 7 of which Banks 0, 1, 6, and 7, are illustrated, and each labelled 40 since they are essentially similar. Though not specifically illustrated, each Bank is comprised of four Memory Modules and each Bank has a total capacity of 524K words. A word in memory is 44-bits, of which 36-bits are data bits and the remaining eight bits are utilized for Error Correction Code (ECC) check bits and parity bits. Each Bank 40 is arranged for receiving four words W1, W2, W3, and W4, labelled 42 for writing, and four such words labelled 44 when read out.

The memory Banks 40 include the addressing circuitry, the storage cells, the timing circuits, and the driver circuits, and can be constructed from commercially available components, it being understood that the accessing rate must accommodate the interface rates with the attached units.

The heavy lines indicate directions of data flow, and the single lines indicate control flow.

At the input, the HPSU has an IOP interface 46 which can accommodate up to four IOP units, at the four IOP ports labelled IOP0 through IOP3. It also has an IP interface 48 which can accommodate up to four IPs at the four IP ports designated IP0 through IP3. The IOP ports 46 and the IP ports 48 each operate on a two-word interface at a clock rate of 60 nanoseconds.

The HPSU also has an input SP interface 50 which can accommodate two SPs at the two ports labelled SP0 and SP1. The SP ports each function with a four-word simultaneous interface and operate at a clock rate of 30 nanoseconds.

The request and control signals from the IOP ports 46 are passed to the IOP Priority 52, which functions to select the particular IOP to be given priority of access to the memory system. The selection is passed on line 54 to the IOP MUX 56 which functions to select the appropriate data and address information to pass on line 58 to the Bank Priority and Selector (MUX) 60. The control signals provided on control path 62 drive the Bank Decode 64 for selecting one-of-eight control lines 66 for providing control signals for making Bank selection.

In a similar manner, the IP ports 48 provide control signals to the IP Priority 68, which provides control signals on control line 70 to the IP MUX 72 for selecting the data and address signals that will be provided on path 74. Similarly, the control signals on line 76 to the Bank Decode 78 results in signals being provided to select one of eight lines 80 for controlling Bank selection.

The two SP ports 50 are each arranged to store requests in Stack 0 labelled 82, and in Stack 1 labelled 84. SP requests and data are temporarily held in Stack 0 and Stack 1 awaiting availability of the memory system. In essence, Stack 0 and Stack 1 are each a first-in-first-out (FIFO) circulating buffer. The request information feeds out of Stack 0 on line 86 to the Bank Decode 88 which provides a one-of-eight selection and data passes on line 92 to the Bank Priority Selector 60. Similarly, request information passes on line 94 to the Bank Decode 96 for making selection on lines 98, while the data passes on line 100.

The Bank Priority and Selector functions to select between the IOP, IP, and the two SP requests presented to it for accessing memory. It also functions to control the Output Selector 102 when reading is to take place.

The HPSU has an IOP output 104 capable of handling four IOP ports IOP0 through IOP3. It also has an IP output 106 capable of handling four IP ports labelled IP0 through IP3. Finally, it has an SP output 108 capable of handling two SP output ports labelled SP0 and SP1. Data rates and timing at the output ports 104, 106 and 108 are similar to those for the input ports previously described.

D. Multiple Adapter (MUA)

Figure 3:
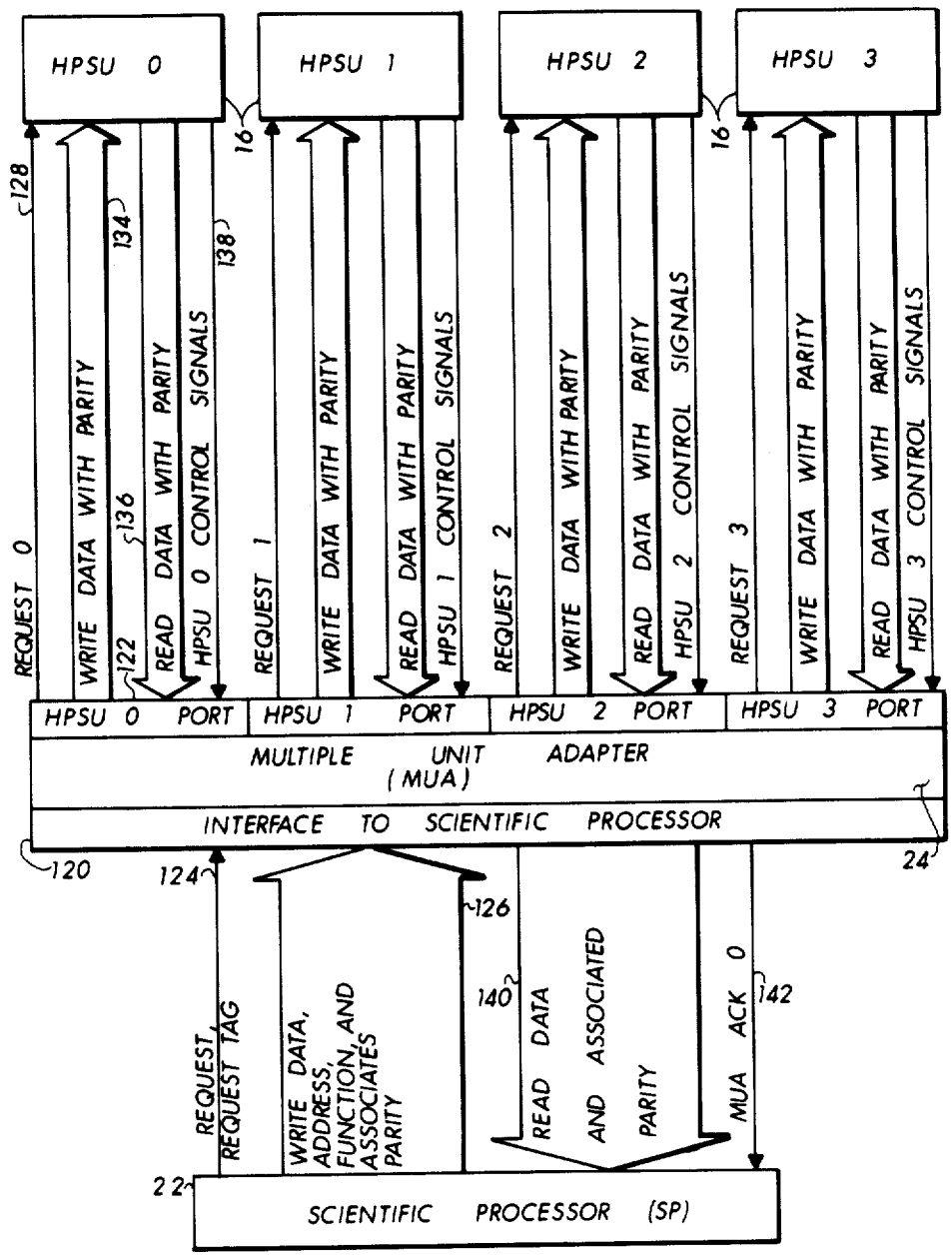
FIG. 3 is a simplified block diagram of the Multiple Unit Adapter (MUA) for providing selective interconnection of a Scientific Processor to one of up to four High Performance Storage Units.

FIG. 3 is a simplified block diagram of the Multiple Unit Adapter (MUA) for providing selctive interconnection of a Scientific Processor to one of up to four High Performance Storage Units.

The MUA 24 has an Interface to Scientific Processor 120 and up to four HPSU ports 122, each adapted for interconnection to an associated HPSU 16.

A Scientific Processor (SP) issues Request signals on control path 124 to the MUA. For a write operation, the write data, address, function, and associated parity is provided via cable 126. The MUA can accumulate up to eight request from the SP without acknowledgement, and the requests and the associated data are stored in a first-in-first-out (FIFO) stack (not shown).

For purposes of example, if it is assumed that the SP has designated HPSU0, and the request is determined by the MUA to the next request to be processed, a Request 0 will be provided on control path 128 to HPSU0. Recalling that this will be only one of several requests that can be provided to HPSU0, it will be honored when its priority is selected. If the function is write, the write data with parity will be provided on cable 134. If the function is to read, the read data with parity will be passed from HPSU0 on cable 136 to the MUA. Upon completion of the requested function, the HPSU0 control signals will pass via control path 138 to the MUA. When the MUA establishes that the current request is a read, the read data and associated parity will pass on cable 140 to the SP. As each request is passed on to the selected HPSU, an MUA Acknowledge 0 (ACK 0) nal will be passed on control path 142 to the SP, thereby indicating that the stack has room for one more request.

When the MUA has passed eight requests to an HPSU without acknowledgement the MUA ceases requesting until an Acknowledge 1 (ACK 1) control signal is received in control cable 138.

The control and data path lines for HPSU1, HPSU2, and HPSU3, would function in a similar manner. When the SP reqests access to a different HPSU, all outstanding requests to the first HPSU must be serviced prior to the MUA processing requests to a different HPSU.

All data and control signals from the SP are passed on to the HPSU, with the exception of a few special control signals, and all data and control signals from the HPSU are passed on to the SP. The SP data word is four 36-bit words wide. Along with the data field, an address field of 22-bits and a function field of 6-bits are sent with the request. Odd parity is provided for every 9-bits of data, making the SP data word transmission a total of 160-bits, the address field a total of 25-bits, and the function code field a total of 7-bits.

E. Scientific Processor (SP)

Figure 4:
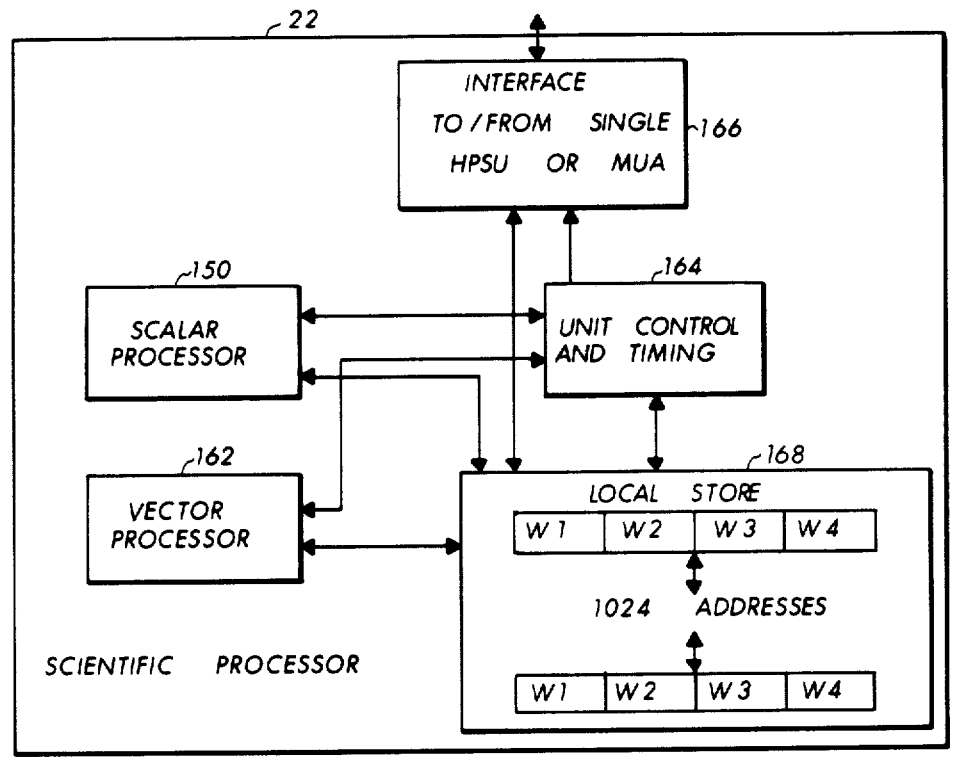
FIG. 4 is a simplified blocked diagram of the Scientific Processor.

FIG. 4 is a simplified block diagram of the Scientific Processor.

Basically, the SP 22 is a subsystem defined as an attached processor of the host system. The SP has been optimized for the high speed execution of floating-point vector arithmetic operations. It is intended to execute user code only and is not intended to run an executive program. It does not require a control program nor does it have any priveledged modes of operation. The SP includes distinct modules, the Scalar Processor 150, the Vector Processor 162, the Unit Control Timing 164, the Interface 166, and the Local Store 168.

The Vector Processor module 162 performs vector calculations. The Scalar Processor module 150 performs scalar operations, and also has the over-all control function, including instruction fetch and issue. Generally speaking, the Scalar and Vector processor modules operate in parallel although some Scientific Processor instructions require both modules to execute.

The Local Store 168 in the preferred embodiment comprises a high speed random-access memory (RAM) 4,096 words. The arrangement is such that four words W1 through W4 are accessed simultaneously, yielding an addressable range of 1,024 addresses. The Local Store 168 is used primarily for the storage of frequently used scalar variables, and it should be noted is distinguished from the relatively large dedicated memory sections in prior art support processors, the minimal storage being rendered sufficient through the coupling to the plurality of HPSUs.

The general system environment and background described with regard to FIG. 1 through FIG. 4 is set forth to indicate the complexity of the data processing system in which the subject invention may be utilized.

F. Stack Access Through-Check System

Figure 5:
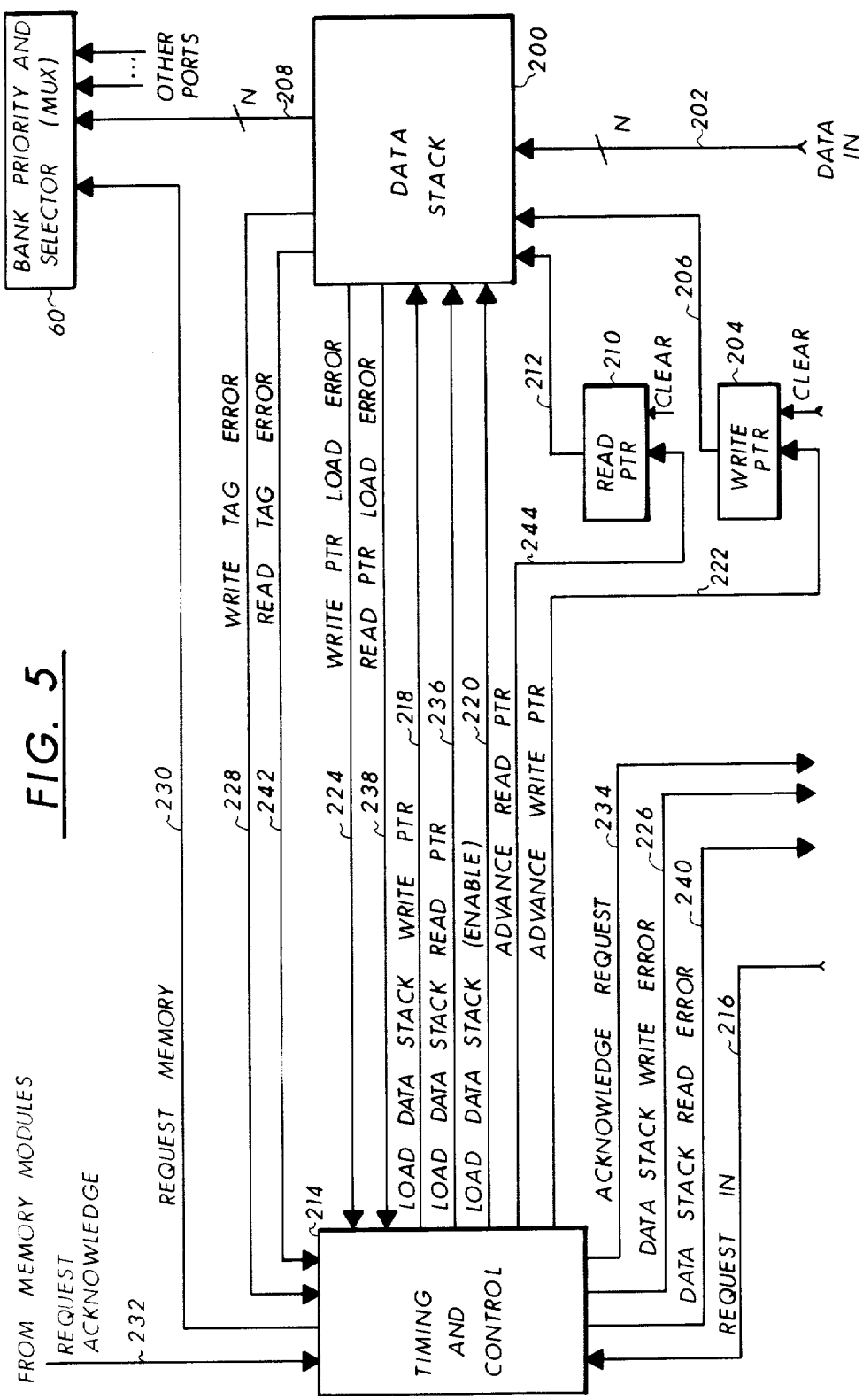
FIG. 5 is a simplified block diagram of a data stack that verifies proper loading of read and write accessing signals and verifies decoding of read and write access signals.

FIG. 5 is a simplified block diagram of a data stack that verifies proper loading of read and write accessing signals and verifies decoding of read and write access signals.

A Data Stack 200, which will be described in more detail below, is comprised of a plurality of addressable Stack Registers, and receives Data In on line 202. The Data In is N-bits, and can include Data, Function, Address, and the like, and will be understood to be pipelined in the HPSU. The Data Stack 200 includes circuitry for identifying the Stack Register in which a data word is to be written, and for identifying the Stack Register from which data is to be read, together with through-checking circuitry for analyzing loading a decoding of access control signals. Details of the interface signals and controls are defined in co-pending application entitled "High Performance Storage Unit" identified above.

Access to write in Data Stack 200 is under control of a Write Pointer (Write PTR) generated by Write PTR counter 204 which functions to provide a count indicative of the Stack Register to be accessed on line 206. In one embodiment, the Data Stack 200 comprises eight Stack Registers and is accessed by a 3-bit Write Pointer.

The accessing of the Data Stack 200 for read out on line 208 is under control of a Read Pointer (Read PTR) generated by the Read PTR counter 210. It provides Stack Register accessing signals on line 212.

As will be described in more detail below, the Data Stack 200 includes decoding circuitry for decoding both the Write Pointer and the Read Pointer.

The Timing and Control 214 functions in response to a Request signal received on line 216 to issue a Load Data Stack Write PTR signal on line 218 thereby causing the Write PTR to be decoded for selecting the Stack Register at which the Data In will be written. At substantially the same time, a Load Data Stack signal will be issued on line 220 to enable the Stack Registers to be written. Thereafter, an Advanced Load PTR signal will be issued on line 222 to cause the Write PTR 204 to be advanced to indicate the next sequential Stack Register in which writing should take place.

At the time the Write PTR is loaded, the Data Stack 200 evaluates it for proper loading, and if it is detected that the Write PTR has improperly loaded, a Write PTR Load Error signal will be issued on line 224 to Timing and Control 214 which will in turn issue a Data Stack Write Error signal on line 226 to notify the Requester that data was not properly written in the Data Stack.

When the Write PTR is applied to the Data Stack, it is decoded for selection of one and only one of the Stack Registers. As will be described in more detail below, each Stack Register has associated therewith an uniquely identifying Write Tag (WTAG) which is utilized for through-checking the Stack Register selection. When the decoding is detected to be in error through failure of comparison of the selected WTAG to the Write PTR, the Data Stack 200 issues a Write Tag Error signal on line 228. Again, this causes Timing and Control 214 to issue a Data Stack Write Error signal on line 226.

When a Request has been properly loaded, a Request Memory signal is issued on line 230 to Bank Priority and Selecter (MUX) 60. This circuitry functions to pass the selected data word read from the Data Stack 200 to the appropriate memory module when it is available. When a memory reference has been completed, a Request Acknowledge will be provided on line 232 from the Memory Modules. When Timing and Control 214 determines that the Data In has been loaded in the Data Stack 200, it issues an Acknowledge Requester signal on line 234 thereby indicating that it is ready to process a next Request In.

As mentioned above, reading from the Data Stack is under control of the Read PTR 210. The Timing and Control 214 issues a Load Data Stack Read PTR signal on line 236, thereby loading the Read PTR into the Data Stack. When read in, the Read PTR is evaluated for proper loading, and if detected to have been loaded in error, results in a Read PTR Load Error signal being issued on line 238 back to Timing and Control 214. Such an error signal results in a Data Stack Read Error signal being issued on line 240 back to the Requester to indicate that a Read Error has occurred. At substantially the same time as the Read PTR is checked for proper loading, it is decoded for selection of one and only one of the Stack Registers to be read out. Each of the Stack Registers has associated therewith an uniquely identifying Read Tag (RTAG) that is utilized in checking the proper decoding of the Read PTR. If the Read PTR when decoded fails to meet a comparison requirement with the appropriate RTAG, the Data Stack 200 issues a Read Tag Error signal on line 242, which results in the issuance of a Data Stack Read Error signal on line 240.

When a Stack Register is appropriately read from Data Stack to the selected Memory Module (not shown in detail) the Request Acknowledge signal received on line 232 will cause Timing and Control 214 to issue an Advance Read PTR signal on line 244, thereby positioning the Read PTR 210 to provide access to the next sequential Stack Register for reading.

G. Timing Sequence

Figure 6A:
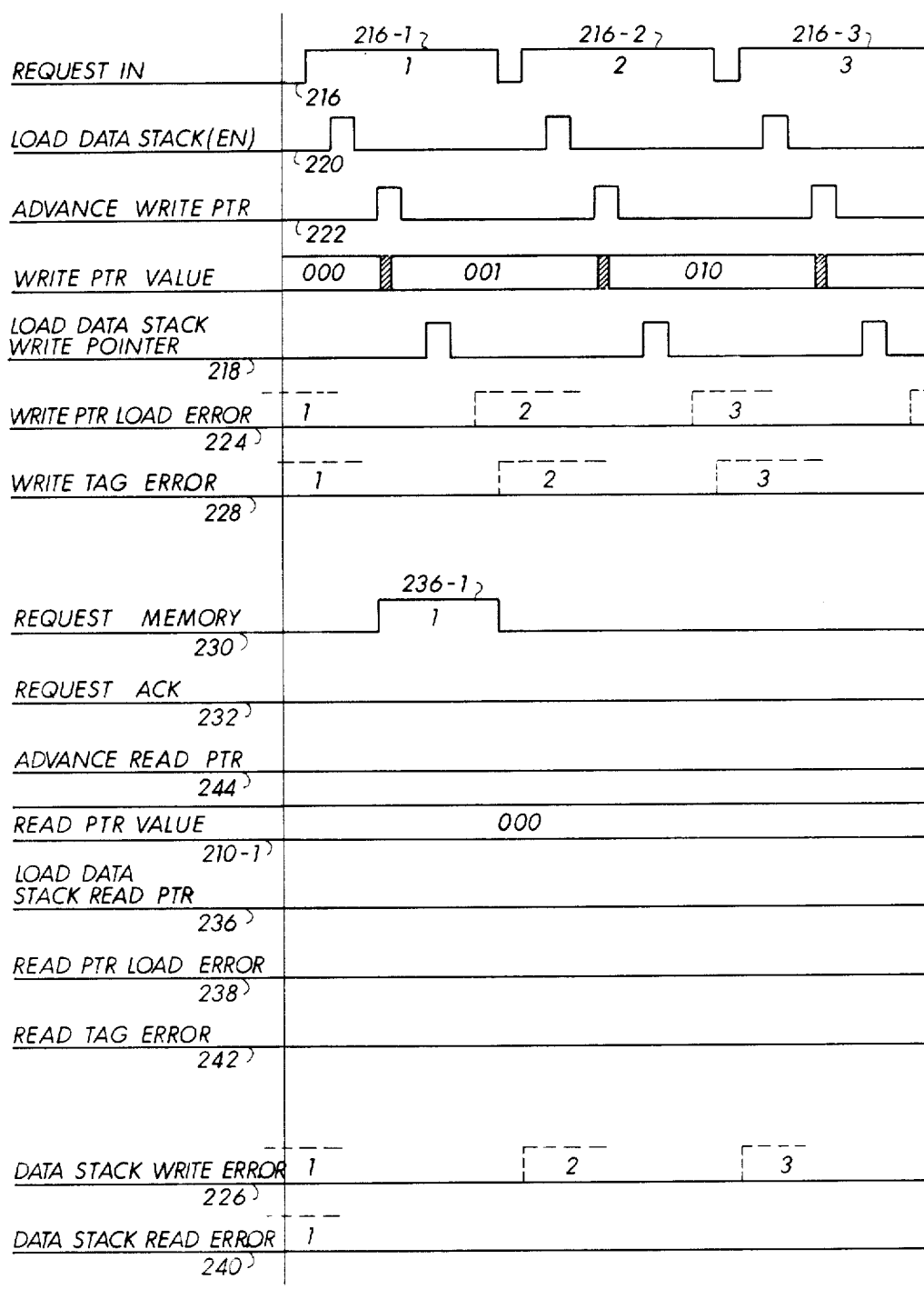
Figure 6B:
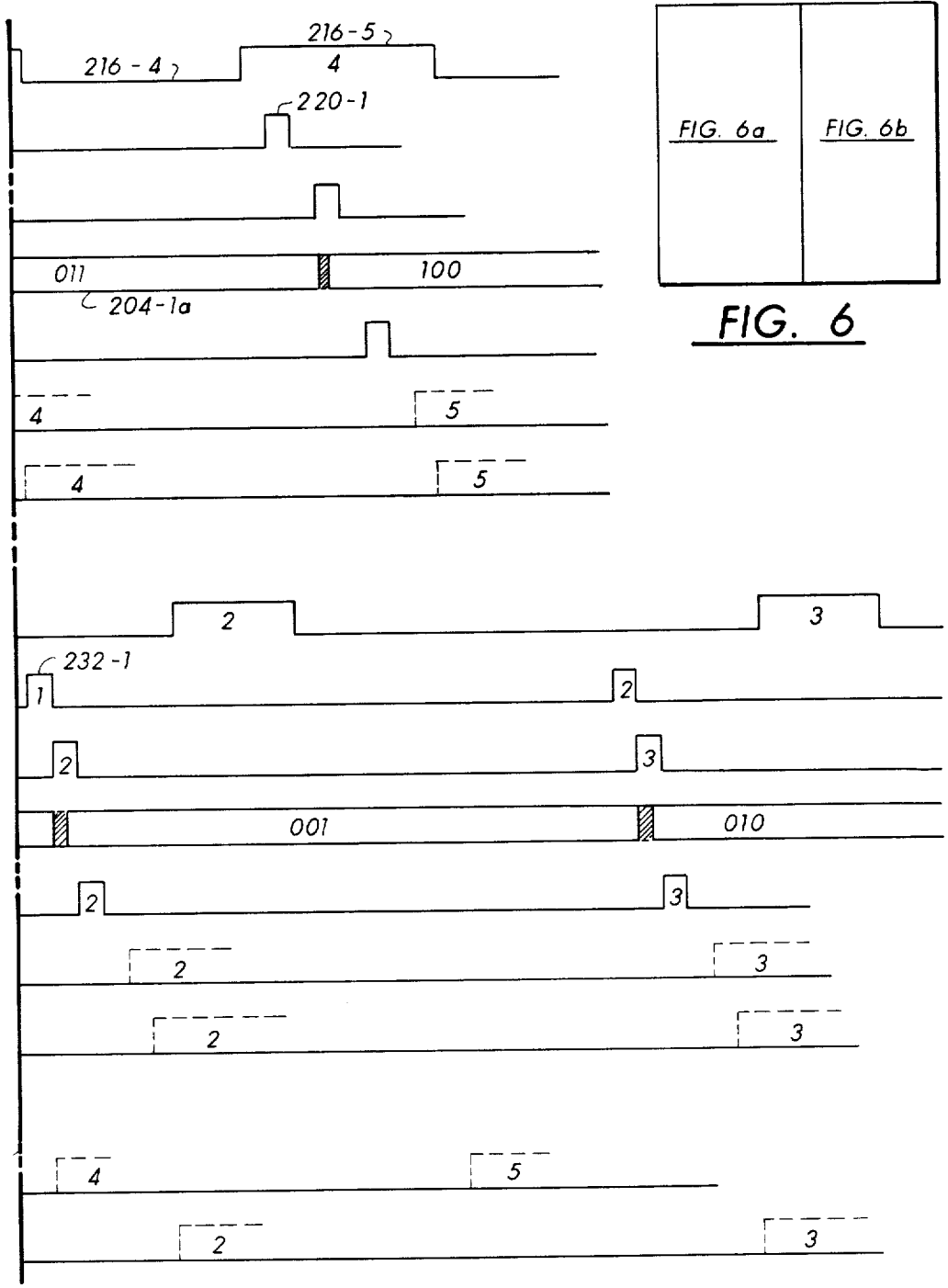

FIG. 6 is a sequence timing diagram illustrating the sequences of the through-checking of stack access signals. In this sequence diagram, the identified signals are idealized, and are intended to illustrate sequences of events rather than precisely timed wave forms. Signals that have been previously described bear the same reference signals. The Write PTR Value 204-1 illustrates the count stored in the Write PTR Counter 204, and the Read PTR Value 210-1 illustrates the count stored in the Read PTR counter 210. Cross-hatched representations illustrate transition values and are essentially indeterminate. It should be noted also, that the sequence representation does not relate to High or Low signals as utilized in the detail logic, but rather represent comparative durations and sequences of events.

The system with respect to Request In signals 216 is such that they may or may not occur regularly. As illustrated, Request In signals 216-1, 216-2, 216-3, for the first three Request In conditions occur regularly and then are separated by a delay 216-4 until the fourth signal 216-5 occurs. This delay 216-4 results in a delay of the issuance of the Load Data Stack signal 220-1 and the Advance Write PTR signal 222-1 and causes the Write PTR Value for binary address 011, 204-1a to remain in place longer then the previous values.

With regard to reading from the Data Stack and recording the memory, it will be seen that after a Request Memory 230-1 signal issues, a time delay will occur until the Request Acknowledge 232-1 occurs. All other functions concerning reading are triggered from the Request Acknowledge and result in advancement of the Read PTR Values.

The error conditions relative to access either during reading or writing in the Data Stack will be described in more detail below with reference to the specific logical circuits.

H. Building Blocks

In consideration of the detailed logic diagrams of the subject invention, standard building block elements will be utilized. Elements of this type are available commercially, or can be fabricated by integrated circuit processes that are well-known.

FIG. 7a is a logic block diagram symbol for a Latch, that will provide true output Q and complement output $\overline{Q}$. The combination of Clear C and Enable E signals will depend upon whether the Latch is cleared or enabled for being set. Two data inputs D or B are shown. A High signal on either data line D or B in conjunction with a Low Enable will result in a High output signal being provided at Q and a Low output at $\overline{Q}$. It is understood that if the Latch is to be responsive to only a single input signal, that the other input signal will not be shown.

FIG. 7b is a Truth Table for the functioning of the Latch illustrated in FIG. 7a.

FIG. 7c is a logic element drawing of the Latch illustrated in FIG. 7a, and illustrates the logical elements and interconnections to accomplish the Latch funciton. This logic element drawing illustrates a circuit that utilizes two Enable signals E1 and E2, both of which must be present to cause the circuit to load. If only a single Enable is desired one can be omitted or led to the Enable level.

FIG. 8a is the logic block diagram symbol for the two-input Exclusive-OR (XOR). The XOR responds to input signals A and B for providing output signal C and signal $\overline{C}$. It functions such that a High input signal on either line A or line B but not both, will result in a High signal at output C and Low signal at output $\overline{C}$. If both A and B receive Low signals or High signals, the output at C will be Low and the output at $\overline{C}$ will be High, thus it can be used as a single-bit comparator.

FIG. 8b is the Truth Table for the Exclusive-OR illustrated in FIG. 8a.

Figure 9:
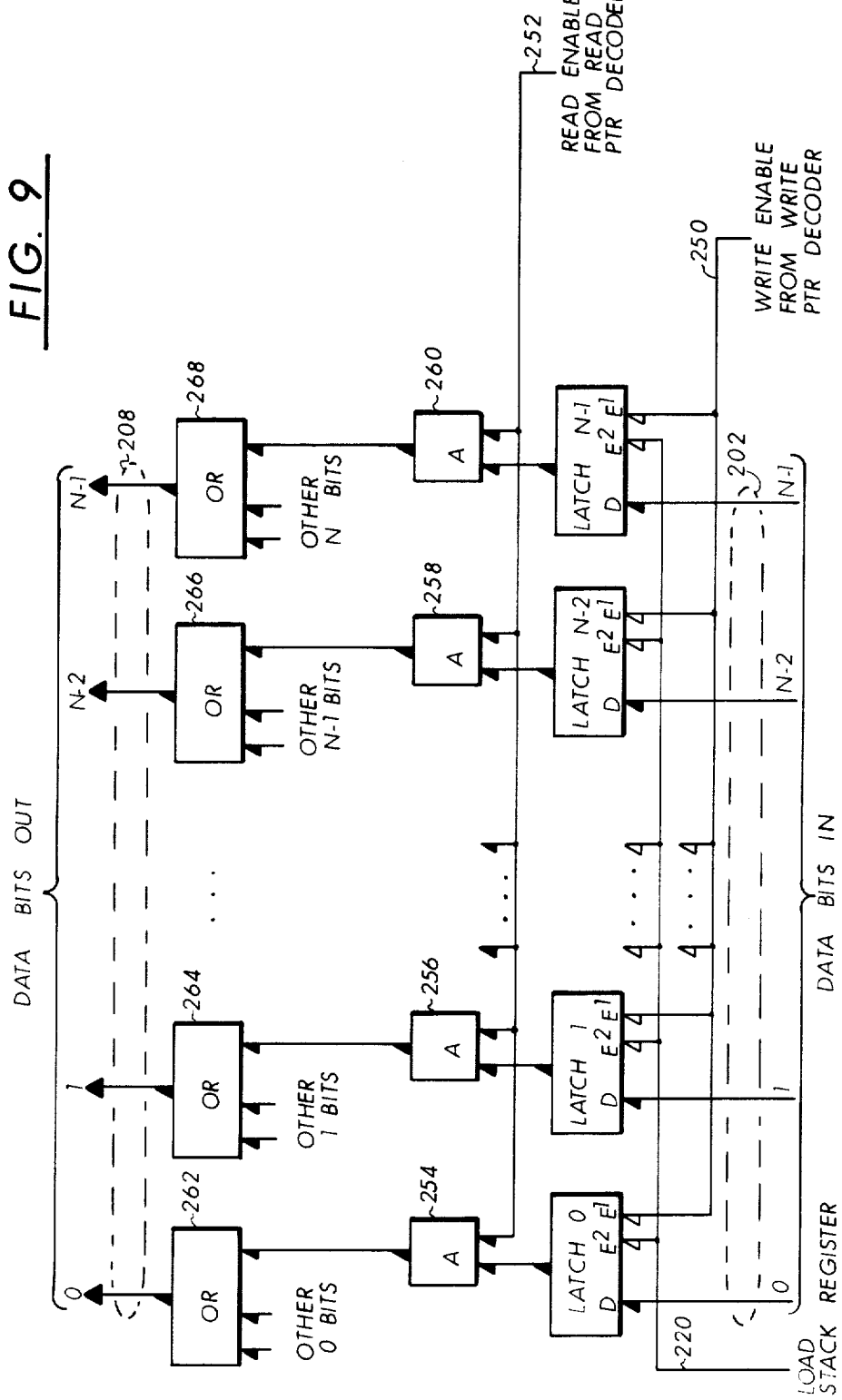
FIG. 9 is a logic block diagram symbol for an N-bit stack register with write enable and read enable.

FIG. 9 is a logic block diagram symbol for an N-bit stack register with write enable and read enable. This example of an N-bit Register is comprised of Latch circuits identified as Latch 0 through Latch N-1, each adapted for receiving an associated one of the Data Bits In on associated lines 200. The Latches are dual enabled, with the enable E2 for all Latches received on line 220 as the enable signal identified as Load Stack Register, previously described. Another Enable signal (E1) for all Latches will be received on line 250 from the Write PTR decoder. The concurrence of the Enables E1 and E2 allows the Latches to be set to the state of the associated data bits in. The Latches drive associated AND circuits 254, 256, 258, and 260 respectively. These AND circuits receive the Read Enable signal on line 252 from the Read PTR Decoder. Each of the AND circuits drive a respectively associated OR circuit 262, 264, 266, and 268. These OR circuits receive like-ordered bits from other Stack Registers, and function to provide the selected N-bit data word out on lines 208.

Figure 10A:
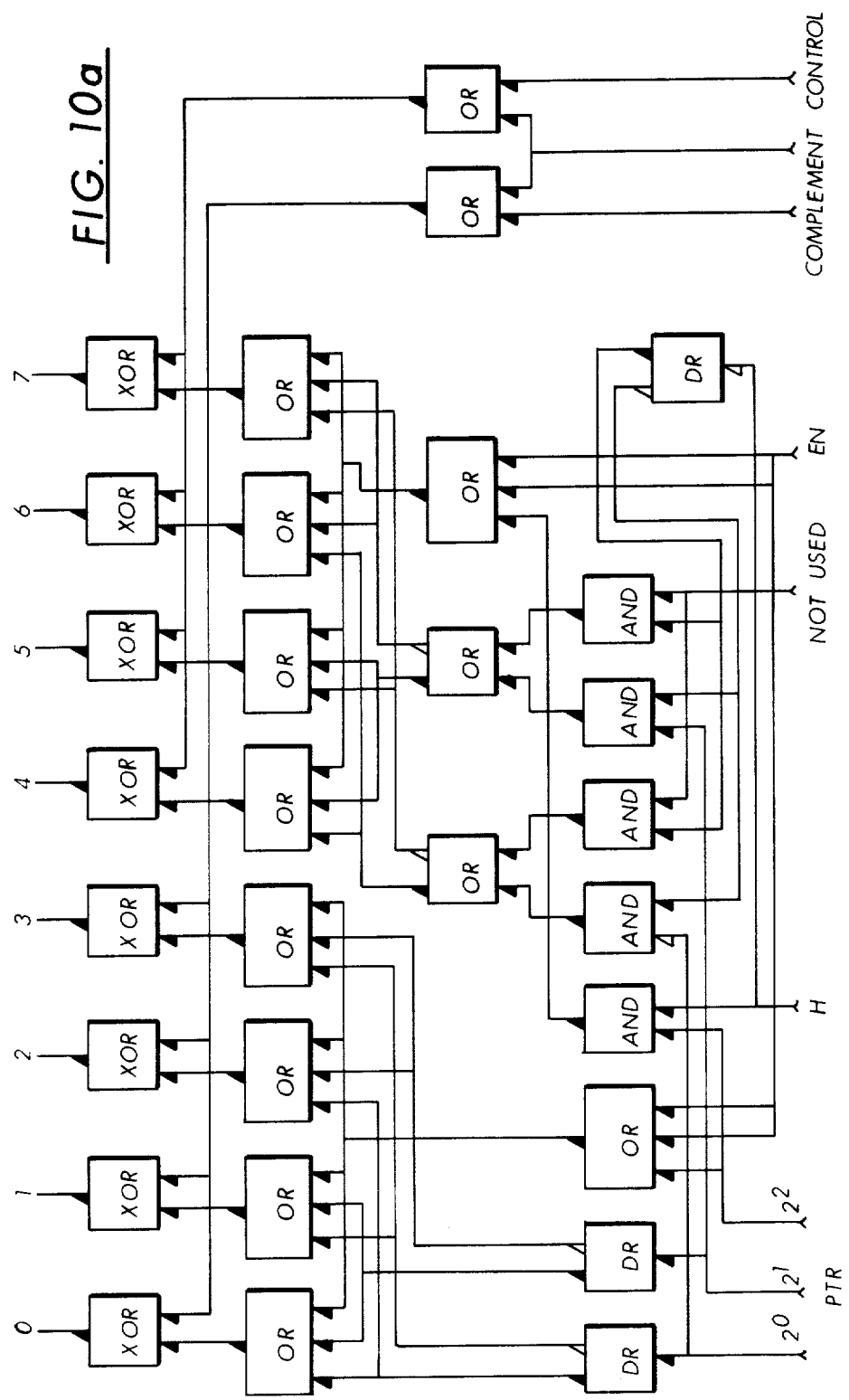
FIG. 10a is a logic block diagram of a three-to-eight decoder.

FIG. 10a is a logic block diagram of a three-to-eight Decoder. Functionally, the Decoder operates to select one and only one of the output terminal labelled 0 through 7 in a Low state in response to the 3-bit octal number applied at the PTR input terminals. All output terminals not selected will be in the High state. For example, if a PTR value of octal 100 is applied, output terminal 0 will be Low and all other terminals will be High. For the embodiment illustrated, the COMPLEMENT CONTROL signals can be held Low and no complementing will take place or can be held High such that the output signals are inverted. The Decoder can be utilized to complement either all of the output terminals, output terminals 0 through 3, or output terminals 4 through 7, depending upon the signal levels applied to the COMPLEMENT CONTROL lines. Decoding will take place upon the application of an Enable (EN) signal and the application of the PTR binary values. It is not deemed necessary to trace the step-by-step functioning of the illustrated circuit since this is readily apparent those skilled in the art.

Figures 10B, 11A:
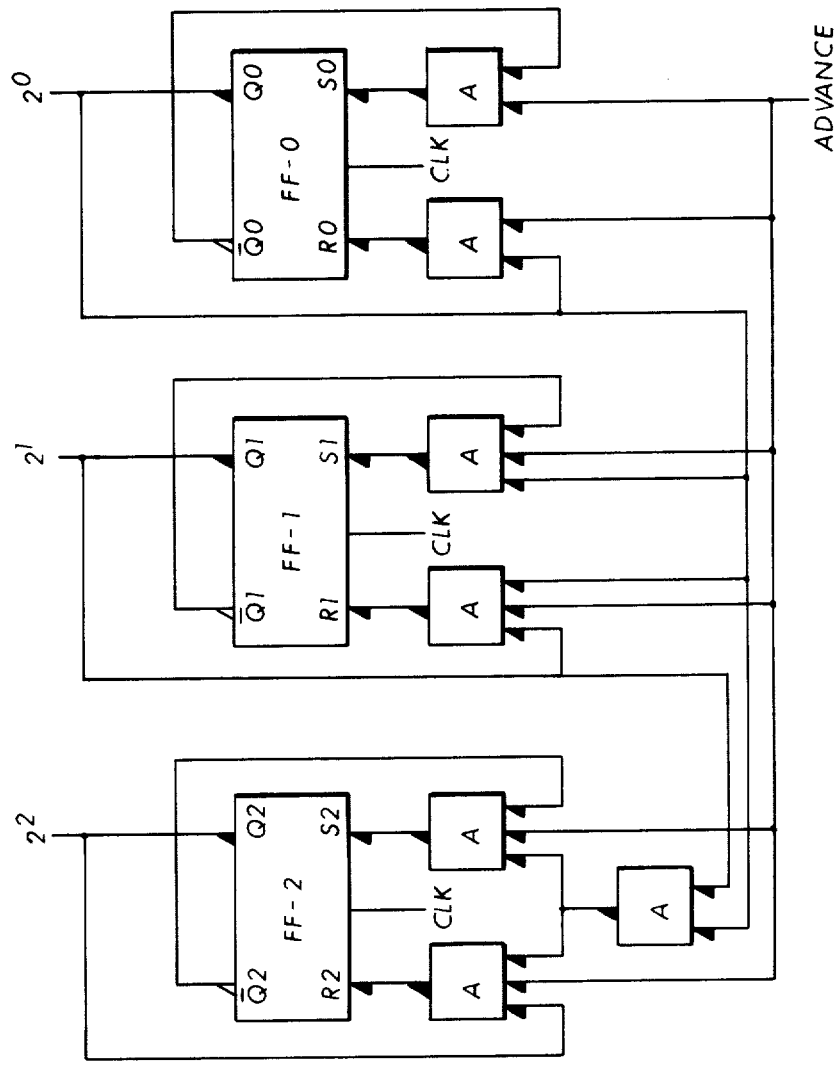

FIG. 10b is a table illustrating the selected Stack Register in response to Pointer input signals for the three-to-eight Decoder illustrated in FIG. 10a.

FIG. 10c is a Decoder Truth Table for the Decoder illustrated in FIG. 10a.

FIG. 11a is a logic block diagram of a three-stage binary counter. The illustrative counter is comprised of three flip-flop circuits designated FF-0, FF-1, and FF-2, interconnected to respond to ADVANCE PULSES to provide the binary count values at output terminals $2^0$, $2^1$, $2^2$. Such a counter can be utilized for Load PTR and for Read PTR. It is of course understood that if a larger capacity Data Stack 200 is required, that the binary counter would be correspondingly expanded. Such expansion will be obvious to those skilled in the art.

FIG. 11b is a table illustrating the count output signals for the counter illustrated in FIG. 11a. The ADVANCE PULSES occur sequentially such that the 0 through 7 ADVANCE PULSES result in the Count signal combinations illustrated. When the Counter has counted through the eight possible combinations, it recycles and starts over, thereby providing a circular count availability for use in driving the virtual stack addressing circuitry.

I. Detailed Logic

Figure 12A:
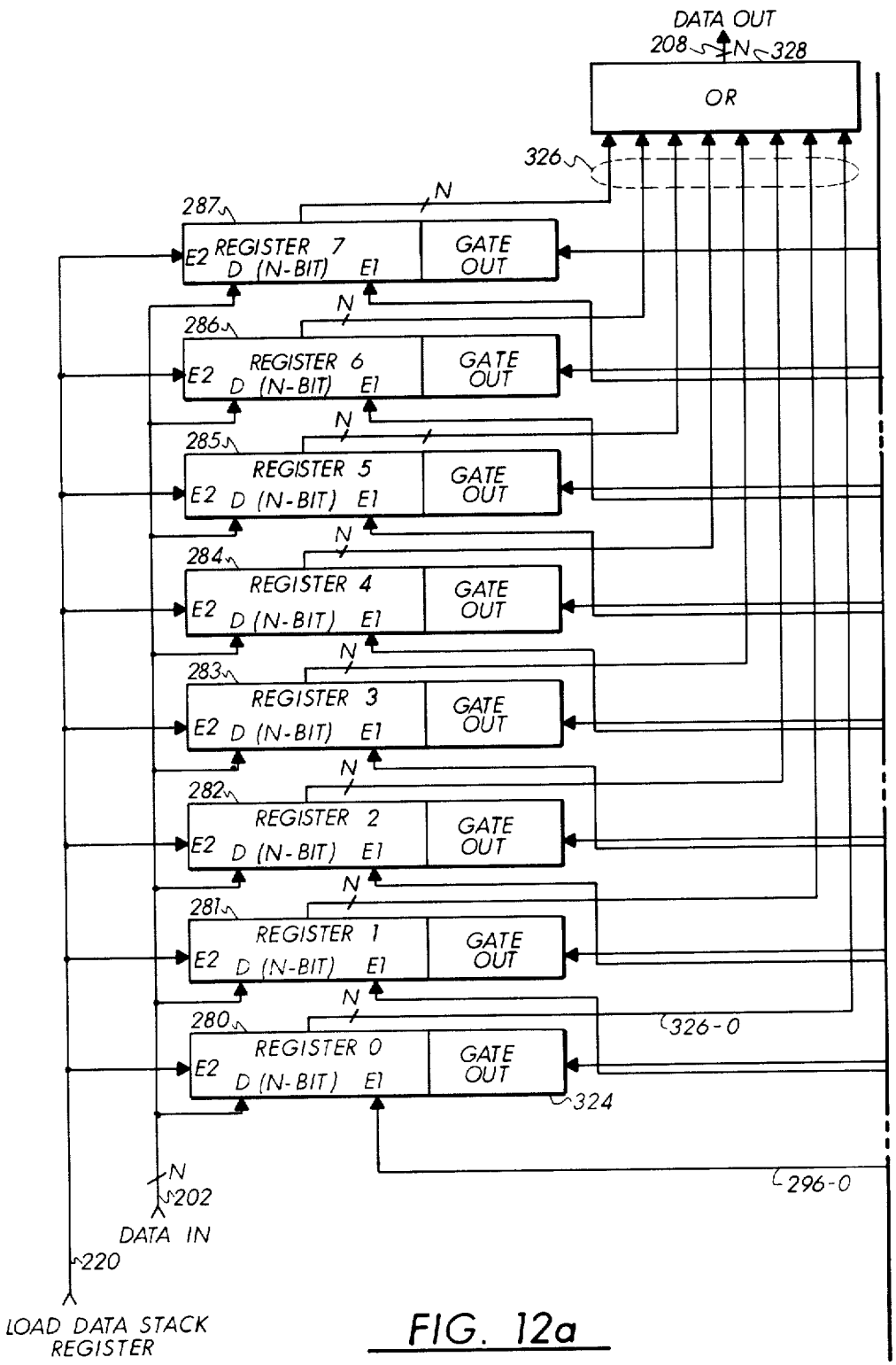
FIG. 12a through FIG. 12c, when arranged as shown in FIG. 12, is a detailed logic block diagram of the virtual first-in first-out pipelined stack, including logic circuits for checking loading and decoding of the Write PTR and loading and decoding of the Read PTR.
Figure 12B:
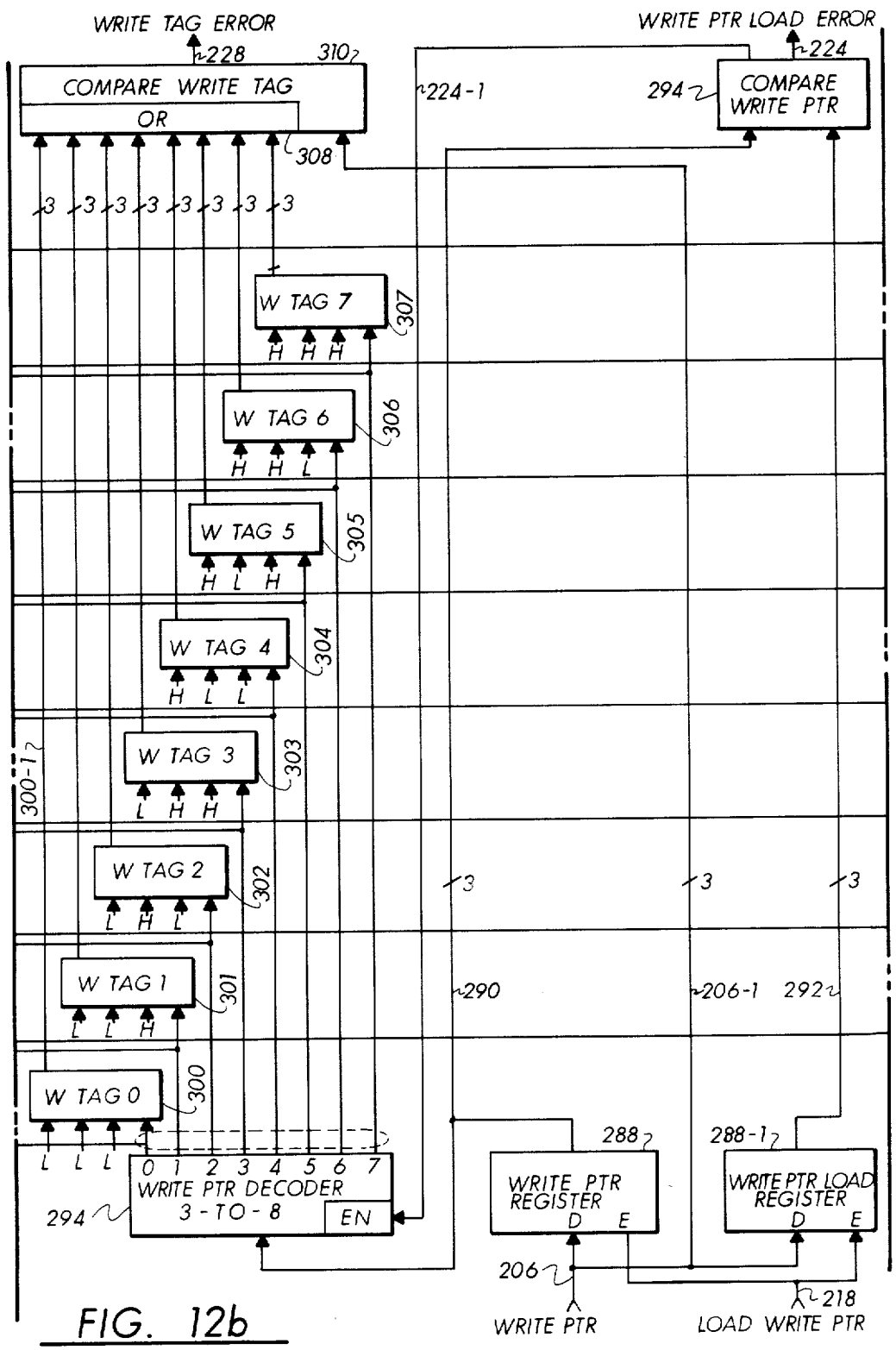
Figure 12C:
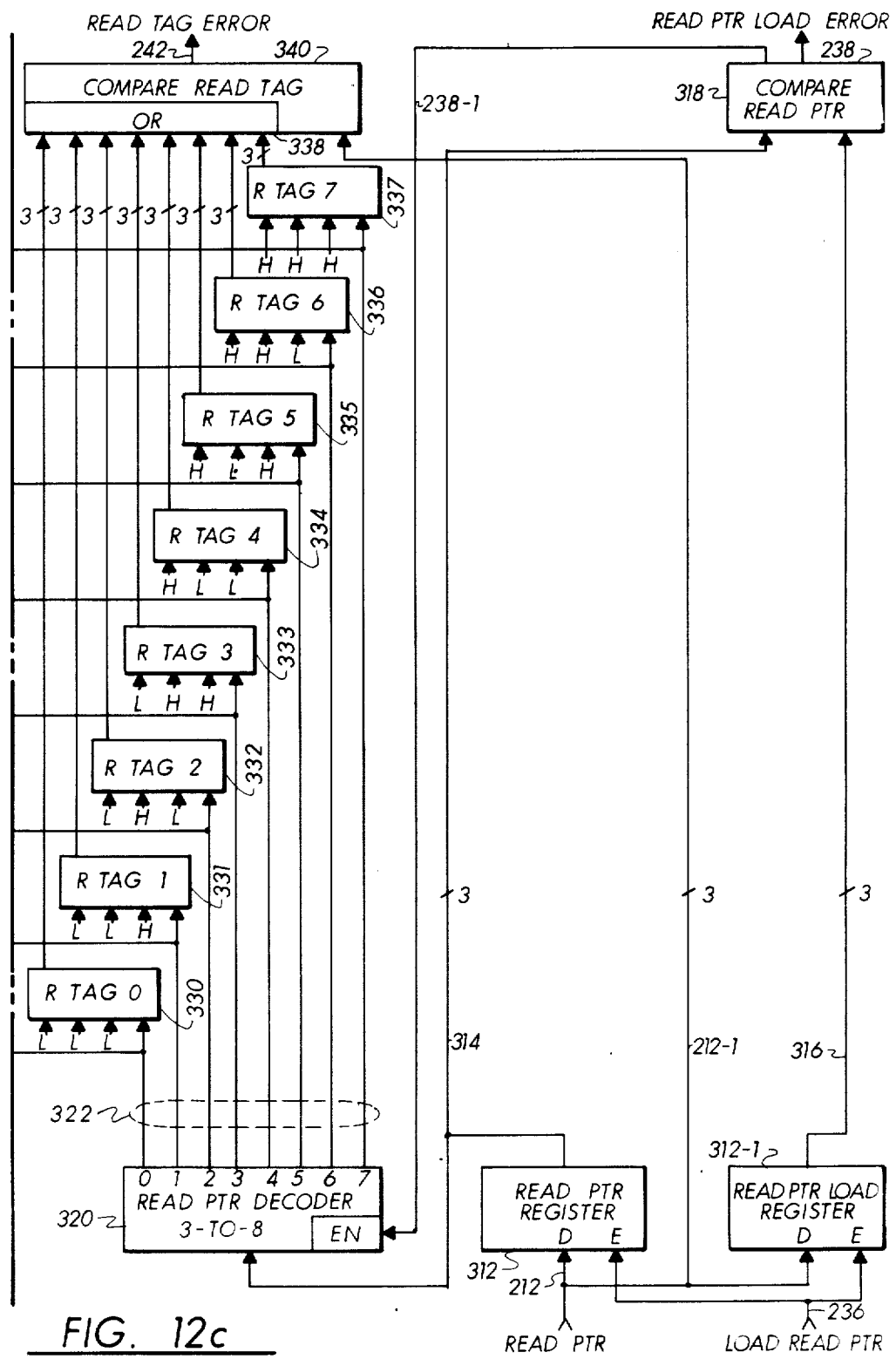

FIG. 12a through FIG. 12c, when arranged as shown in FIG. 12, is a detailed logic block diagram of the virtual first-in first-out pipelined stack, including logic circuits for checking loading and decoding of the Write PTR and loading and decoding of the Read PTR.

The virtual pipelined stack illustrated is comprised of eight N-bit Stack Registers with Register 0 280, Register 1 281, Register 2 282, Register 3 283, Register 4 284, Register 5 285, Register 6 286, and Register 7, 287. The N-bits of Data In are provided on line 202 to all Stack Registers 280 through 287. Similarly, the Load Data Stack Register signals are provided on line 220 to all of the Stack Registers.

The Write PTR is provided on line 206 to a Write PTR register 288 and a second Write PTR Load register 288-1. The Load Write PTR signal is applied on line 218 to both of the Write PTR Registers 288 and 228-1. These Registers when loaded provide output signals on lines 290 and 292, respectively, to a Compare Write PTR circuit 294. The Write PTR is compared on a bit-by-bit basis to ascertain that it has been loaded properly. If any failure of comparison is noted, a Write PTR Load Error signal is issued on line 224. If the Write PTR is found to have been loaded properly, an Enable signal is issued on line 224-1 to the Write PTR Decoder 294 which functions to decode the 3-bit Write PTR into an enable signal on one of eight possible output lines 296. These output enable signals function to provide one of the Enable (E1) signals to the selected Stack Register. For example, if the Write PTR presented is binary 000, it will translate through the Write PTR decoder and provide an enable signal on line 296-0 to Register 0 280 thereby causing it to be loaded with the Data In bits. The functioning of the Write PTR Decoder 294 has been described above.

Each of the Stack Registers 280 through 287 has a Write Tag (WTAG) labelled sequentially 300 through 307. In the preferred embodiment, each WTAG is hard-wired to signal levels that define the associated Stack Register. For example, WTAG 0, labelled 300, is hard-wired to receive three Low input signals indicative of a binary value of 000. WTAG 0 also receives an input signal from the 0 output terminal of the Write PTR Decoder 294 on line 296-1. Thus, when the Write PTR Decoder translates the Write PTR and issues an enable signal at its 0 output terminal, it enables WTAG 0 and also provides the E1 enable to Register 0. When WTAG 0 is thus enabled, it passes the hard-wired WTAG 0 code on line 300-1 to the OR input 308 of the Compare Write Tag circuitry 310. Since the Write PTR Decoder enables one and only one of its output terminals, all of the other WTAG circuits 301 through 307 will not be enabled and only WTAG 0 will be presented in the active state. At the same time, the Write PTR is transmitted on line 206-1 to the Compare Write Tag circuitry 310. These signals are compared on a bit-by-bit basis for equality. If equality is found, it is known that the Write PTR has been properly presented to the Data Stack and has been properly decoded. If any bit difference is detected, a Write Tag Error signal is issued on line 228.

The other WTAG circuits are similarly hard-wired in the preferred embodiment. For example, WTAG 1 receives the signals LLH indicative of binary 001, WTAG 2 receives LHL, indicative of binary 010; WTAG 3 receives LHH, indicative of binary 011; WTAG 4 receives HLL, indicative of binary 100; WTAG 5 receives HLH, indicative of binary 101; WTAG 6 receives HHL, indicative of binary 110; and WTAG 7 receives HHH, indicative of binary 111. Each of the WTAG circuits, when enabled by an appropriate signal from an associated output port of the Write PTR Decoder, functions to provide the selected signal for comparison with the Write PTR in the Compare Write Tag 310 circuitry.

The Read PTR is evaluated in a similar way. The Read PTR is loaded in the Read PTR Register 312 and the Read PTR Load Register 312-1. When enabled by the Load Read PTR 236, the Read PTR is loaded and provided on lines 314 and 316 as inputs to the Compare Read PTR circuitry 318. The two versions of the Read PTR are compared on a bit-by-bit basis, and if found to be different in any bit position, indicates that the Read PTR was improperly loaded, and issues a Read PTR Load Error signal on line 238. If the Read PTR is determined to have been loaded properly, an enable signal is issued on line 238-1 to the Read PTR Decoder 320. As described above, three-to-eight Decoder functions to provide an Enable signal on one and only one of its eight output lines 322 depending upon the 3-bit PTR applied to it. Each of the output terminals is coupled to a respectively associated one of the Stack Registers 280 through 287. For example, output terminal 0 is coupled via line 322-0 to the Gate Out circuitry 324, thereby causing the N-bit word in Register 0 to be read out on line 326-0. Each of the output terminals of Read PTR Decoder 320 is coupled to an associated one of the Gate Out circuits for the Stack Registers, and each provides an N-bit output on lines 326. All of the N-bit data words are passed through OR 328 to the Data Out line 208.

In order to assure the integrity of the application of the Read PTR and its decoding, each of the Stack Registers 280 through 287 has a Read Tag (RTAG) associated with it. These RTAG circuits are designated sequentially 330 through 337. In a manner similar to that described for WTAGs, each of the RTAG circuits is hard-wired to signal levels to signal levels that identify the associated Stack Register. The signal levels listed above for the sequential designation of the Stack Registers applies to the RTAG circuits. Each of the selected 3-bit RTAG bit groupings are provided to the OR input 338 of the Compare Read Tag circuitry 340. The Read PTR is also provided on line 212-1, and the Compare Read Tag circuitry performs a bit-by-bit comparison. If comparison is found, it indicates that the Read PTR has been properly loaded and decoded, but if any difference is detected, a Read Tag Error signal is issued on line 242.

Through the use of the WTAG and RTAG circuits, the stack circuitry is through-checked to assure to the greatest extent possible that the pipelined data words are properly accessed in the appropriate sequence, thereby minimizing the corruption of the data stream that can occur from improper functioning of the loading or decoding circuitry.

It is apparent that the systems described can be expanded to accommodate larger or smaller numbers of Stack Registers. Further, while the WTAG and RTAG circuits are designated as hard-wired, it is apparent that they could be constructed from memory devices, latch circuits, or other logic circuits that would be subject to alteration.

Figure 13:
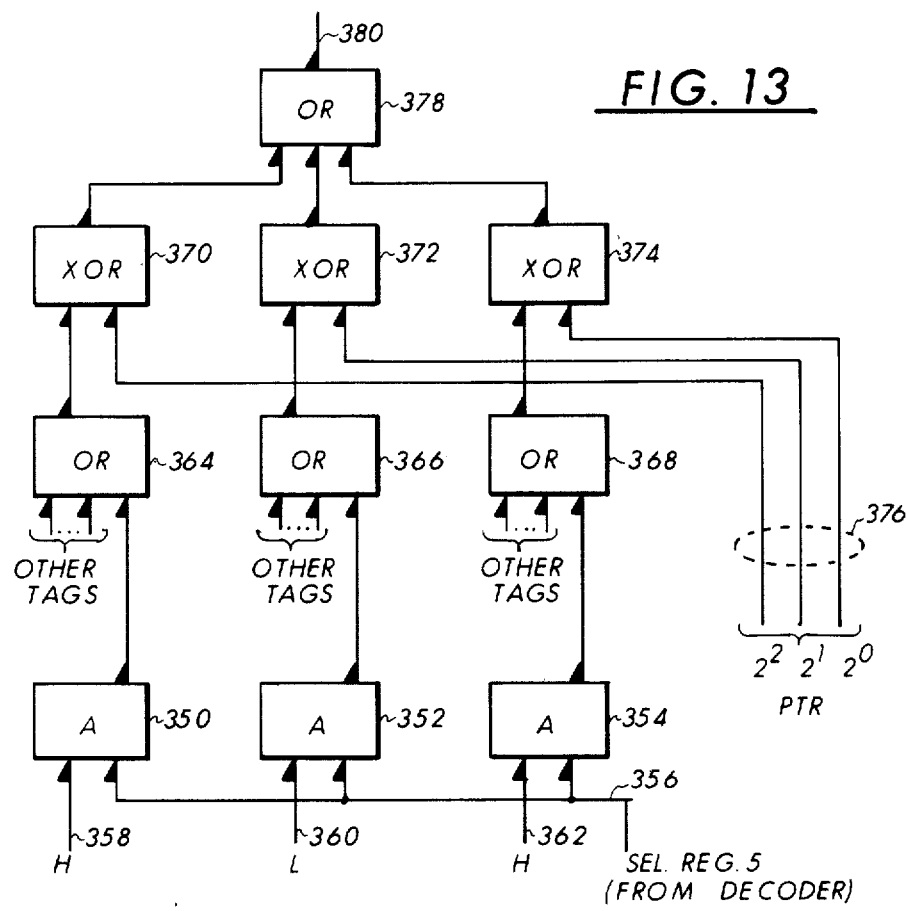
FIG. 13 is a detailed logic block diagram of the bit-by-bit comparison of the decoded pointer to the applied pointer.

FIG. 13 is a detailed logic block diagram of the bit-by-bit comparison of the decoded pointer to the applied pointer. The arrangement is illustrative of the Write Tag or the Read Tag for Stack Register 5. The three AND circuits 350, 352, and 354 are enabled by the 5 output terminal of a three-to-eight Decoder on line 356. Since Register 5 is to be selected, a High signal is applied on line 358 to AND 250, a Low signal on line 360 to AND 352, and a High signal on line 362 to AND 354. The three AND circuit array essentially defines the Tag structure, and it should be understood that the combination of input signals applied would be as described above for the various Tag structures. When enabled, the AND circuits provide their output signals respectively to OR circuits 364, 366, and 368. These OR circuits receive associated bits for the other Tags, it being understood that only one of the Tag structures will be activated by a properly functioning Decoder. The output signals from the OR circuits are applied to respectively associated XOR circuits 370, 372, and 374. The 3-bit Pointer is applied on lines 376, with each bit of the Pointer being associated with a separate one of the XOR circuits. As described above the XOR circuit can function as a one bit comparator. The output terminals of the XOR circuits are provided to OR 378 to issue a Tag Error on line 380 when any bit position is found to not compare. The circuit arrangement illustrated is applicable to either the Write Tag circuitry of the Read Tag circuitry, and it will be understood that each identified Tag will have a set of AND circuits, appropriately driven, to identify the associated Stack Registers.

Figure 14:
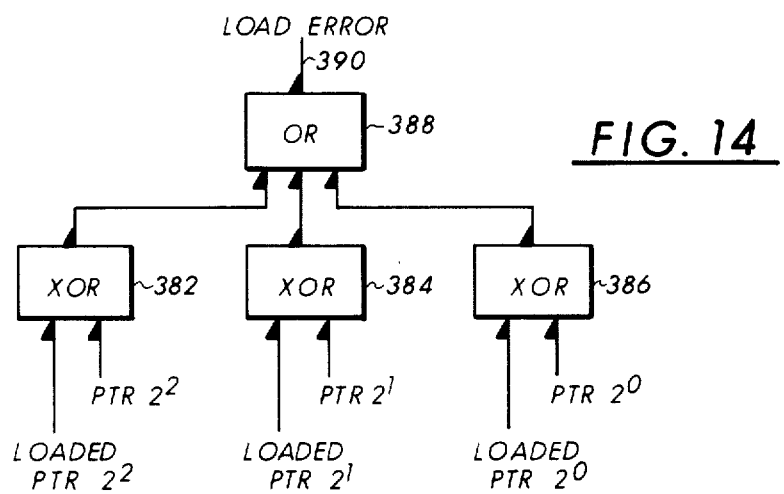
FIG. 14 is a detailed logic block diagram of the logic circuits that check the proper loading of a pointer.

FIG. 14 is a detailed logic block diagram of the logic circuits that check the proper loading of the pointer. The circuitry to compare the Write PTR or Read PTR at loading can be accomplished by a circuit using three XOR circuits labelled 382, 384, and 386 for comparing Pointer positions $2^2$, $2^1$, and $2^0$ respectively. The XOR circuits are bit-comparators and provide output signals to OR 388, such that when any miscomparison is found, a Load Error Signal will issue on line 390.

In view of the foregoing description and discussion of the invention and a preferred embodiment, it can be seen that the various stated objectives and purposes of the invention have been achieve. It is of course understood that various changes in logical circuit arrangement, circuit selection, and functionality will become apparent to those skilled in the art after having considered the teaching, without departing from the spirit and scope of the invention. Accordingly, what is intended to be protected by Letters Patent is set forth in the claims.

What is claimed is:

1. For use in a data processing system, an improved high performance pipelined virtual stack structure comprising:
   a plurality of stack register means for storing data words, each one of said plurality of stack register means selectively addressable by pointer address signals;
   a plurality of tag means, each of said tag means for providing tag signals uniquely identifying by its actual address a correspondingly addressed one of said plurality of stack register means and commonly addressable therewith;
   pointer receiving means for receiving said pointer address signals for commonly accessing selected ones of said plurality of stack register means and a correspondingly addressed one of said plurality of tag means; and
   tag comparison means coupled to said pointer receiving means and said plurality of tag means for comparing the addresses indicated by said pointer address signals and the actual tag signal addresses provided by said plurality of tag means, said tag comparison means to provide pointer error signals in response to a first address comparison condition indicative of a detected fault in accessing the addressed one of said plurality of stack register means and for providing no error signals in response to a second address comparison condition indicative that the one of said plurality of stack register means addressed by said pointer address signals have been properly accessed.

2. A stack structure as in claim 1 wherein said pointer address signals include read pointer address signals for addressing said plurality of stack register means during reading and include write pointer address signals for addressing said plurality of stack register means during writing; and wherein said plurality of tag means includes a group of write tag means commonly addressed with ones of said plurality of stack register means by said write pointer address signals for producing write tag signals, and said plurality of tag means includes a group of read tag means commonly addressed with ones of said plurality of stack register means by said read pointer address signals for producing read tag signals.

3. A stack structure as in claim 2 wherein said tag comparison means includes:
   write tag compare circuit means coupled to said group of write tag means and said pointer receiving means for comparing the addresses indicated by said write tag signals, to said write pointer address signals for providing write tag error signals when said write tag signals and said write pointer signals do not indicate the same address; and
   read tag compare circuit means coupled to said group of read tag means and said pointer receiving means for comparing the addresses indicated by said read tag signals to said read pointer signals for providing read tag error signals when said read tag signals and said read pointer address signals do not indicate the same address.

4. For use in a data processing system, an improved high performance pipelined virtual stack structure comprising:
   a plurality of stack register means for storing data words, each of said plurality of stack register means addressable by pointer address signals;
   a plurality of tag means, each of said tag means for providing tag signals uniquely identifying, via its actual address, an associated one of said plurality of stack register means and commonly addressable therewith;
   pointer receiving means for receiving said pointer address signals for commonly accessing selected ones of said plurality of stack register means and correspondingly addressed ones of said plurality of tag means;
   pointer load means coupled to said pointer receiving means for storing, at least temporarily, said pointer address signals and for providing loaded pointer signals;
   pointer comparison means coupled to said pointer load means and coupled to said pointer receiving means for comparing said pointer address signals to said loaded pointer signals for providing pointer load error signals when the pointer address signals actually loaded in said pointer load means differ from the pointer address signals received from said pointer receiving means; and
   tag comparison means coupled to said pointer receiving means and said plurality of tag means for comparing the addresses indicated by said pointer address signals and said tag signals addressed by said pointer address signals for providing pointer error signals in response to a first address comparison condition indicative of a detected fault in accessing the addressed ones of said plurality of stack register means and for providing no error signals in response to a second address comparison condition indicative that the ones of said plurality of stack register means addressed by said pointer address signals have been properly accessed.

5. A stack structure as in claim 4 wherein said pointer load means includes:
   means for receiving read and write address signals;
   read pointer load means for providing a plurality of signals identically corresponding to those read pointer address signals actually loaded, and includes write pointer load means for providing a plurality of signals, identically corresponding to those write pointer address signals actually loaded; and write pointer comparison means for comparing said write pointer address signals to said write pointer address signals actually loaded for providing write pointer load error signals when they are not the same; and read pointer comparison means for comparing said read pointer address signals to said loaded read pointer address signals for providing read pointer load error signals when an error comparison condition is detected.

6. For use in a data processing system, an improved high performance pipelined virtual stack structure comprising:

a plurality of stack register means for storing data words, each of said plurality of stack register means addressable for writing by write pointer address signals and addressable for reading by read pointer address signals;

a plurality of write tag means and a plurality of read tag means, each of said write tag means for providing write tag signals uniquely identifying, via its actual address, an associated one of said plurality of stack register means and commonly addressable with said write pointer address signals;

write pointer receiving means for receiving said write pointer address signals;

write decoder means responsively coupled to said writer pointer receiving means and having a plurality of output terminals, each coupled to an associated one of said plurality of stack register means and coupled to an associated one of said plurality of write tag means, said write decoder means for providing an enable signal on one of said output terminals in response to the received write pointer address signals for enabling the selected one, as indicated by said write decoder means, of said plurality of stack register means for recording data words, and said write tag means for providing its said write tag signals;

write tag comparison means coupled to said plurality of write tag means and coupled to said write pointer receiving means for comparing said write tag address signals provided by the enabled one of write tag means to said received write pointer address signals for providing write tag error signals in response to a first comparison condition indicative of a detected fault condition in commonly accessing the one of said plurality of stack register means and said write tag means, which detected fault condition occurs when the addressably selected one of said plurality of stack register means does not identically correspond in addressed location to the addressably selected one of said write tag means.

7. A stack structure as in claim 6 wherein said plurality of write tag means each includes unique write tag address signals identical to the ones of said write pointer address signals utilized to address the addressably enabled one of said plurality of stack register means associated therewith.

8. A stack structure as in claim 7 wherein said write pointer address signals are temporarily stored in a write pointer load means which is coupled to said write pointer receiving means for temporarily storing received ones of said write pointer address signals for providing write pointer address signals which indicate those write pointer address signals actually loaded; and loaded write pointer comparison means coupled to said write pointer load means and coupled to said write pointer receiving means for comparing said write pointer address signals to said write pointer signals actually loaded in said write pointer load means for providing write pointer load error signals when an error comparison condition, as indicated by a lack of correspondence between the address signals received from the write pointer receiving means and those address signals actually loaded in said write pointer load means, is detected.

9. A stack structure as in claim 6 and further including a plurality of read tag means, wherein each of said read tag means provides read tag signals addressably identifying a corresponding one of said plurality of stack register means and commonly addressable with said read pointer address signals;

read pointer receiving means for receiving said read pointer address signals;

read decoder means responsively coupled to said read pointer receiving means and having a plurality of output terminals, each coupled to an associated one of said plurality of stack register means and coupled to an associated one of said plurality of said read tag means, said read decoder means for providing an enable signal on one of said output terminals in response to the received read pointer address signals for enabling the addressably decoded register means of said plurality of stack register means for reading data words, and said read tag means for providing its said read tag signals;

read tag comparison means coupled to said plurality of read tag means and coupled to said read pointer receiving means for comparing said read tag signals provided by the enabled one of said read tag means to said received read pointer address signals for providing read tag error signals in response to a first comparison condition indicative of a detected fault condition in commonly accessing the addressed register means of said plurality of stack register means and said read tag means.

10. A stack structure as in claim 9 wherein said plurality of read tag means each includes address read tag signals identical to the ones of said read pointer address signals utilized to address the correspondingly addressed one of said plurality of stack register means.

11. A stack structure as in claim 5 wherein said read pointer load means is coupled to a read pointer receiving means for temporarily storing received ones of said read pointer address signals and for providing read pointer signals corresponding to those actually loaded into the read pointer load means; and loaded read pointer comparison means coupled to said read pointer load means and coupled to said read pointer receiving means for comparing said read pointer address signals to said loaded read pointer signals for providing read pointer load error signals when an error comparison condition, as indicated by a lack of correspondence between the two, is detected.

* * * * *